United States Patent
Jones et al.

(10) Patent No.: US 9,766,636 B2
(45) Date of Patent: Sep. 19, 2017

(54) DEVICE AND METHOD FOR DILUTION CONTROL

(75) Inventors: Timothy S. Jones, Sharpsburg, GA (US); Christopher F. Lang, Racine, WA (US); Susan K. Lewis, Gurnee, IL (US); Michael Roosa, Mount Horeb, WI (US); Jeffrey L. Crull, McFarland, WI (US); Michael Maloney, Fitchburg, WI (US); Thomas Sutrina, Rockford, IL (US); Jonathan Mick, Marshall, WI (US)

(73) Assignee: Diversey, Inc., Sturtevant, WI (US)

( * ) Notice: Subject to any disclaimer, the term of this patent is extended or adjusted under 35 U.S.C. 154(b) by 1792 days.

(21) Appl. No.: 12/282,797

(22) PCT Filed: Mar. 21, 2007

(86) PCT No.: PCT/US2007/064524
§ 371 (c)(1),
(2), (4) Date: Mar. 23, 2009

(87) PCT Pub. No.: WO2007/109727
PCT Pub. Date: Sep. 27, 2007

(65) Prior Publication Data
US 2011/0197972 A1   Aug. 18, 2011

Related U.S. Application Data

(60) Provisional application No. 60/871,296, filed on Dec. 21, 2006, provisional application No. 60/784,969, filed on Mar. 22, 2006.

(51) Int. Cl.
G05D 11/02    (2006.01)
G05D 11/00    (2006.01)
(Continued)

(52) U.S. Cl.
CPC ........ *G05D 11/006* (2013.01); *B01F 15/0416* (2013.01); *G05D 11/001* (2013.01);
(Continued)

(58) Field of Classification Search
CPC ......... Y10T 137/2514; Y10T 137/2516; Y10T 137/2496; Y10T 137/2572;
(Continued)

(56) References Cited

U.S. PATENT DOCUMENTS 224,299 A    2/1880   Lininger
340,313 A *  4/1886   Donald .................... 137/101.31
(Continued)

FOREIGN PATENT DOCUMENTS

DE    4026283    2/1991
EP    0098419    1/1984
(Continued)

OTHER PUBLICATIONS

Office Action from the US Patent and Trademark Office for U.S. Appl. No. 13/619,816 dated Apr. 1, 2013 (12 pages).
(Continued)

*Primary Examiner* — Craig Schneider
*Assistant Examiner* — Minh Le
(74) *Attorney, Agent, or Firm* — Michael Best & Friedrich LLP

(57) ABSTRACT

A dilution control device and method of operating the same. The dilution control device can include a structure for dispensing concentrate and diluent fluid in a desired dilution ratio utilizing volumetric dosing. In some embodiments, diluent fluid drives a wheel or compresses a pliable concentrate bag in order to dispense concentrate in the desired ratio with the diluent fluid. In some embodiments, one or more floats can be used to drive a pump or actuate a valve to dispense concentrate at a particular rate proportional with
(Continued)

the flow rate of the diluent fluid. In some embodiments, a rocker is responsive to the flow of diluent fluid to pump concentrate. In some embodiments, the dilution control device can be operable to automatically modulate the dispense rate of concentrate when the diluent fluid flow rate is varied in order to maintain a predetermined dilution ratio.

26 Claims, 19 Drawing Sheets

(51) Int. Cl.
  *B01F 15/04* (2006.01)
  *G05D 11/03* (2006.01)
(52) U.S. Cl.
  CPC .......... *G05D 11/003* (2013.01); *G05D 11/008* (2013.01); *G05D 11/03* (2013.01); *Y10T 137/0329* (2015.04)
(58) Field of Classification Search
  CPC ........ Y10T 137/2531; Y10T 137/2529; G05D 11/001; G05D 11/003; G05D 11/006; G05D 11/008; G05D 11/03; B01F 15/0416
  USPC ...... 137/98, 99, 87.01, 114, 101.21, 101.19; 222/367, 57, 424.5, 48
  See application file for complete search history.

(56) References Cited

U.S. PATENT DOCUMENTS

| 917,139 | A | * | 4/1909 | Robison | 137/99 |
|---|---|---|---|---|---|
| 976,148 | A | * | 11/1910 | Caps | 137/99 |
| 1,331,110 | A | | 2/1920 | Hutchens | |
| 1,476,457 | A | | 12/1923 | Miller | |
| 1,687,876 | A | | 10/1928 | Moeser | |
| 1,726,082 | A | * | 8/1929 | McLaughlin et al. | 137/99 |
| 1,726,083 | A | * | 8/1929 | McLaughlin et al. | 137/99 |
| 1,749,811 | A | * | 3/1930 | Groeck et al. | 137/101.21 |
| 1,831,684 | A | | 11/1931 | Petersen | |
| 2,094,161 | A | | 9/1937 | Paddock | |
| 2,098,618 | A | * | 11/1937 | Dostert | A01C 1/08 137/99 |
| 2,117,789 | A | * | 5/1938 | Cleary | 137/99 |
| 2,543,941 | A | * | 3/1951 | Sargent | 169/15 |
| 2,895,646 | A | | 7/1959 | George | |
| 3,068,492 | A | | 12/1962 | Price | |
| 3,164,302 | A | | 1/1965 | Indjian | |
| 3,346,144 | A | | 10/1967 | Hings | |
| 3,381,699 | A | * | 5/1968 | Coffman | 137/101.21 |
| 3,549,048 | A | * | 12/1970 | Goodman | 222/57 |
| 3,575,535 | A | * | 4/1971 | Bickar | 417/244 |
| 3,620,415 | A | | 11/1971 | Ruth | |
| 3,627,177 | A | | 12/1971 | Marcus et al. | |
| 3,642,171 | A | | 2/1972 | Ernst | |
| 3,713,565 | A | | 1/1973 | Langford | |
| 3,869,069 | A | | 3/1975 | Levey et al. | |
| 3,953,902 | A | | 5/1976 | Taylor | |
| 3,984,698 | A | | 10/1976 | Brewer | |
| 4,023,778 | A | | 5/1977 | Joly et al. | |
| 4,185,653 | A | | 1/1980 | Armstrong et al. | |
| 4,228,928 | A | | 10/1980 | Hocker et al. | |
| 4,246,753 | A | * | 1/1981 | Redmond | 60/398 |
| 4,336,822 | A | * | 6/1982 | Carrell | 137/268 |
| 4,363,341 | A | | 12/1982 | Powell | |
| 4,452,174 | A | * | 6/1984 | Fedder | G03G 15/0853 222/57 |
| 4,467,217 | A | * | 8/1984 | Roussey | 290/54 |
| 4,522,231 | A | * | 6/1985 | Bergmann | 137/625.17 |
| 4,538,919 | A | | 9/1985 | Bohnensieker | |
| 4,651,765 | A | * | 3/1987 | Beth | 137/99 |
| 4,651,899 | A | | 3/1987 | Pauls et al. | |
| 4,655,370 | A | * | 4/1987 | Harrison | G01F 1/05 222/57 |
| 4,731,545 | A | | 3/1988 | Lerner et al. | |
| 4,838,310 | A | * | 6/1989 | Scott et al. | 137/624.14 |
| 4,923,368 | A | * | 5/1990 | Martin | 415/202 |
| 4,968,437 | A | | 11/1990 | Noll et al. | |
| 5,163,824 | A | | 11/1992 | Kantner | |
| 5,167,800 | A | * | 12/1992 | Ringer et al. | 210/101 |
| D333,951 | S | | 3/1993 | Courtney | |
| 5,427,350 | A | * | 6/1995 | Rinkewich | 251/30.01 |
| 5,738,249 | A | * | 4/1998 | Kikuchi et al. | 222/148 |
| 5,803,268 | A | | 9/1998 | Levy et al. | |
| 5,905,312 | A | | 5/1999 | Liou | |
| 6,029,286 | A | | 2/2000 | Funk | |
| 6,029,688 | A | | 2/2000 | Kaufman | |
| 6,036,333 | A | | 3/2000 | Spiller | |
| 6,079,871 | A | | 6/2000 | Jonas et al. | |
| 6,129,106 | A | * | 10/2000 | Kornelson et al. | 137/91 |
| 6,173,458 | B1 | | 1/2001 | Maddux | |
| D463,226 | S | | 9/2002 | Winkler | |
| 6,551,053 | B1 | * | 4/2003 | Schuetz | 415/3.1 |
| 6,616,403 | B1 | * | 9/2003 | Smith et al. | 415/3.1 |
| 6,765,308 | B1 | | 7/2004 | Kazanjian et al. | |
| 6,769,449 | B2 | * | 8/2004 | Stearns | 137/99 |
| 6,798,080 | B1 | * | 9/2004 | Baarman et al. | 290/43 |
| D510,609 | S | | 10/2005 | Huang | |
| 7,014,759 | B2 | | 3/2006 | Radford | |
| 7,032,787 | B2 | | 4/2006 | Sherk, Jr. et al. | |
| 7,067,936 | B2 | | 6/2006 | Baarman et al. | |
| 7,121,495 | B2 | * | 10/2006 | Caamano | 242/390.5 |
| D534,044 | S | | 12/2006 | Zak | |
| D540,906 | S | | 4/2007 | Hardwick | |
| 7,222,487 | B1 | * | 5/2007 | Hinkley | 60/639 |
| 7,235,894 | B2 | | 6/2007 | Roos | |
| 7,322,052 | B2 | | 1/2008 | Alexander | |
| D571,432 | S | | 6/2008 | Hardwick | |
| D599,879 | S | | 9/2009 | Bertucci et al. | |
| D619,676 | S | | 7/2010 | Bertucci et al. | |
| 8,603,257 | B2 | | 12/2013 | Burt et al. | |
| 2001/0024038 | A1 | | 9/2001 | Cavalheiro | |
| 2002/0070248 | A1 | | 6/2002 | Lohr | |
| 2002/0113442 | A1 | | 8/2002 | Yumita | |
| 2005/0247742 | A1 | | 11/2005 | Livingston et al. | |
| 2006/0043738 | A1 | | 3/2006 | Roos | |
| 2011/0024457 | A1 | * | 2/2011 | Somerfield | E03C 1/046 222/145.1 |
| 2011/0173976 | A1 | * | 7/2011 | Meadon et al. | 60/639 |

FOREIGN PATENT DOCUMENTS

| FR | 1060506 | 4/1954 |
|---|---|---|
| FR | 2808898 | 11/2001 |
| GB | 09067 | 6/1916 |
| GB | 266883 | 3/1927 |
| GB | 777043 | 6/1957 |
| GB | 974211 | 11/1964 |
| GB | 9742211 | 11/1964 |
| JP | 62-266133 | 11/1987 |
| JP | 09014129 | 1/1997 |
| JP | 09048479 | 2/1997 |
| JP | 2000-342948 | 12/2000 |
| JP | 2004-035031 | 5/2004 |
| JP | 2005-076855 | 3/2005 |
| JP | 2011-179183 | 9/2011 |
| WO | 9748321 | 12/1997 |

OTHER PUBLICATIONS

United States Patent Office Action for U.S. Appl. No. 15/050,943 dated Nov. 3, 2016 (7 pages).
Office Action from the Canadian Intellectual Property Office for Application No. 2681359 dated Mar. 3, 2014 (2 pages).
Office Action from the U.S. Patent and Trademark Office for U.S. Appl. No. 13/619,816 dated Mar. 24, 2014 (12 pages).
Office Action from the United States Patent and Trademark Office for U.S. Appl. No. 12/282,797 dated Sep. 26, 2013 (23 pages).
Office Action from the United States Patent and Trademark Office for U.S. Appl. No. 13/619,816 dated Apr. 1, 2013 (12 pages).

(56) References Cited

OTHER PUBLICATIONS

International Search Report from Korean Patent Office.
International Search Report from the European Patent Office.

* cited by examiner

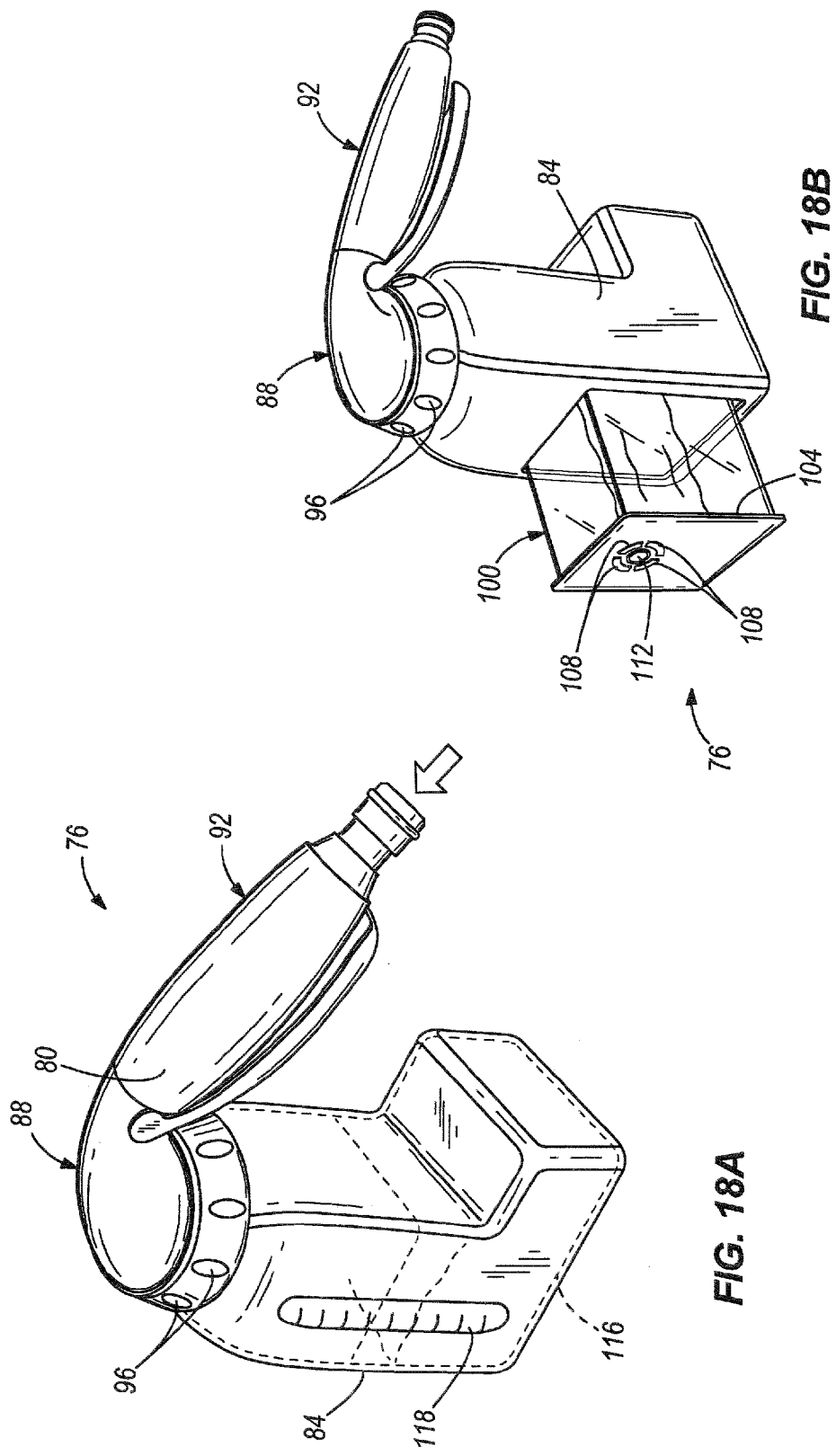

DEVICE AND METHOD FOR DILUTION CONTROL

BACKGROUND OF THE INVENTION

Many different types of dosing equipment are used to dose concentrated cleaning chemicals and other types of chemicals into a final use solution at a predetermined dilution ratio. Some types of equipment are plumbed directly to a water source (i.e., volumetric eductor based dispensing). However, installation of this type of equipment can be cost prohibitive. Other types of equipment utilize portion control, wherein a predetermined amount of concentrated chemicals is dispensed into a mixing container and another liquid is added to the container separately to dilute the concentrated chemicals. This type of equipment requires the user to know exactly how much of the chemical and diluent is needed for the proper mixing ratio. Accordingly, it can require a user to know the size or volume of a container being filled and to fill the container to an appropriate level. This, however, may be difficult when filling or only partially filling sinks, reservoirs within a floor cleaning machine, buckets, and various other containers.

Accordingly, there is a need for a dilution control system that utilizes volumetric dosing principles without the need for expensive installation costs.

SUMMARY OF THE INVENTION

In some embodiments, a device for receiving fluid to be diluted is provided, and can include a mechanism for controlled dispense of the fluid mixed with diluent a predetermined dilution ratio. The device can include a mechanism for automatically adjusting the dispense rate of concentrate as the flow rate of fluid is changed to maintain the predetermined dilution ratio.

Some embodiments of the present invention provide a method of dispensing fluid diluted to a predetermined dilution ratio, wherein the ratio is maintained as the flow rate of fluid is varied.

The present invention relates to a dilution control system that utilizes volumetric dosing, but does not necessarily require expensive installation costs. In other words, some embodiments of the present invention provide a dispensing apparatus or method that draws or otherwise delivers a concentrated chemical proportionally to the flow rate of a diluent. Some embodiments of the present invention utilize a wheel with a horizontal axis and buckets, floats, or other containers at its rim, wherein diluent or water flowing into or onto the buckets provide power to dispense concentrated chemicals at an appropriate dilution ratio to the diluent flowing into or onto the wheel. Specifically, the wheel harnesses the power of diluent and provides power to other structures or elements for dispensing concentrated chemicals.

One particular embodiment of the present invention utilizes a free flow or gravity fed wheel as part of a dilution control system. The diluent can freely flow from a source over an air gap into the wheel. The diluent is captured within the scoops or containers of the wheel, which causes the wheel to rotate. The wheel is mounted to a shaft that rotates with the wheel. Rotation of the shaft is then used dispense the concentrated chemical. In some embodiments, the shaft directly dispenses the concentrated chemical. In other embodiments, the shaft indirectly dispenses the concentrated chemical by actuating other devices, such as gears, shafts, pumps, etc.

Another embodiment utilizes a wheel directly connected to a source of diluent, such as a faucet, as part of a dilution control system. The pressure and speed of the diluent as it is fed to the wheel can provide mechanical advantage for dispensing chemical product into the diluent. The diluent is captured within the scoops or containers of the wheel, which causes the wheel to rotate. The wheel is coupled to a shaft that rotates with the wheel. Rotation of the shaft is then used dispense the concentrated chemical. In some embodiments, the shaft directly dispenses the concentrated chemical. In other embodiments, the shaft indirectly dispenses the concentrated chemical by actuating other devices, such as gears, shafts, pumps, etc. In some embodiments, the wheel is coupled to an electrical generator. The power generated from the electrical generator can then be utilized to power a pump.

Some particular embodiments of the present invention provide a chemical dispensing apparatus comprising a housing at least partially defining a flow path or fluid passageway adapted to receive a diluent from a diluent source and a rotary power wheel coupled to the housing and in fluid communication with the fluid passageway. The rotary power wheel is driven by the impact or weight of diluent flowing through the fluid passageway. A shaft is coupled to the housing and the wheel, wherein the shaft is adapted to rotate with the wheel. A pump is coupled to the housing and the shaft. The pump is in fluid communication with a reservoir containing a concentrated chemical and the pump is actuated by rotation of the shaft to deliver concentrated chemicals to diluent flowing through the fluid passageway.

Some other embodiments of the present invention provide a chemical dispensing apparatus comprising a housing at least partially defining a flow path or fluid passageway adapted to receive a diluent from a diluent source and the housing is coupled to a concentrated chemical reservoir. A rotary power wheel coupled to the housing and in fluid communication with the fluid passageway. The rotary power wheel is driven by the impact or weight of diluent flowing through the fluid passageway. A shaft is coupled to the housing and the wheel and adapted to rotate in response to rotation of the wheel. The shaft is positioned within an aperture or flow path of the concentrated chemical reservoir and is adapted to selectively dispense concentrated chemicals from the reservoir via rotation of shaft. In some embodiments, the shaft includes a rotary metering device in communication with the aperture or flow path of the concentrated chemical reservoir. Rotation of the shaft causes the rotary metering device to dispense concentrated chemical from the reservoir. The rotary metering device of some embodiments comprises a flatted portion of the shaft in selective communication with the concentrated chemical; rotation of the flattened portion adjacent the aperture provides metered dispensing of a concentrated chemical in the chemical reservoir. The rotary metering device of other embodiments comprises a disc coupled to the shaft and having at least one aperture for receiving concentrated chemical when in communication with the concentrated chemical. Also, in some embodiments, the shaft is a first shaft and the chemical dispensing apparatus further comprises a second shaft and a set of gears. The second shaft is directly coupled to the wheel and adapted to rotate with the wheel, and the set of gears are positioned to provide power from the second shaft to the first shaft.

Some embodiments of the present invention provide a chemical dispensing apparatus comprising a housing at least partially defining a fluid passageway adapted to receive a diluent from a diluent source and a wheel coupled to the housing and in fluid communication with the fluid passageway. The wheel is driven by the impact or weight of diluent flowing through the fluid passageway. A shaft is coupled to the housing and the wheel, wherein the shaft is adapted to rotate with the wheel. A generator is coupled to the shaft and adapted to rotate in response to rotation of the shaft. Rotation of the generator produces electricity. A pump is in electrical communication with the generator and in fluid communication with a reservoir containing a concentrated chemical. The pump is actuatable during rotation of the wheel to deliver concentrated chemicals to diluent flowing through the fluid passageway.

Some constructions of the above embodiments can include other features. For example, some embodiments include a conduit at least partially positioned in the housing to deliver the concentrated cleaning chemical from the pump to diluent passing through the fluid passageway. The conduit can be positioned to deliver the concentrated cleaning chemical to the wheel to allow the concentrated chemical to be mixed with the diluent in the wheel. Also, in some embodiments, the reservoir containing the concentrated chemical is contained within the housing. In other embodiments, the reservoir containing the concentrated chemical is located remotely relative to the housing and in fluid communication with the housing via a conduit extending between the pump and the reservoir. Some embodiments also include a set of gears coupled to the housing and positioned to provide power from the shaft to the pump. The set of gears can include a gear ratio that is selected to provide predetermined dilution ratio. In some embodiments, the pump is dimensioned and configured to deliver a predetermined amount of concentrated chemical to the diluent per each rotation of the wheel. Some embodiments also include a funnel along the fluid passageway, upstream from the wheel, wherein the funnel gathers water without direct connection to a source of diluent and directs the diluent to the wheel. Other embodiments, however, include a backflow prevention device that is coupled to the housing and wherein the backflow prevention device is directly connected to the source of diluent.

Other embodiments are directed to a method of proportionately mixing a concentrated chemical with a diluent. One particular method comprises delivering a diluent to a fluid passageway of a housing and rotating a wheel coupled to the housing and in fluid communication with the fluid passageway via the impact of diluent on the wheel. A pump coupled to the housing is operated via rotation of the wheel. The pump is in fluid communication with a reservoir containing a concentrated chemical and operation of the pump is proportional to the rotation of the wheel. Concentrated chemicals are drawn from the reservoir in response to operating the pump and delivered to the diluent. Some embodiments also include the steps of operating a generator with the wheel and generating electricity with the generator. The electricity is then used to power the pump.

Another method comprises delivering a diluent to a fluid passageway of a housing and rotating a wheel that is coupled to the housing and in fluid communication with the fluid passageway via the impact of diluent on the wheel. This causes rotation of a shaft coupled to the wheel. The shaft includes a rotary metering device coupled to the shaft and positioned in a selectively blocking position of an aperture positioned in a concentrated chemical reservoir. Concentrated chemical is selectively dispensed from the reservoir in response to rotation of the shaft and the rotary metering device and delivered to the diluent.

Further aspects of the present invention, together with the organization and operation thereof, will become apparent from the following detailed description of the invention when taken in conjunction with the accompanying drawings.

BRIEF DESCRIPTION OF THE DRAWINGS

FIG. 12 is a perspective view of a dispensing apparatus embodying aspects of the present invention coupled to a container to be dispensed into, such as the dividers of a sink, the wall of a bucket, and the like.

FIG. 15 is a perspective view of a dispensing apparatus embodying aspects of the present invention coupled to a container to be dispensed into, such as the dividers of a sink, the wall of a bucket, and the like.

FIG. 18A is a perspective view of a dilution control device according to another embodiment of the present invention;

FIG. 18B is a partially exploded perspective view of the dilution control device shown in FIG. 18A;

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
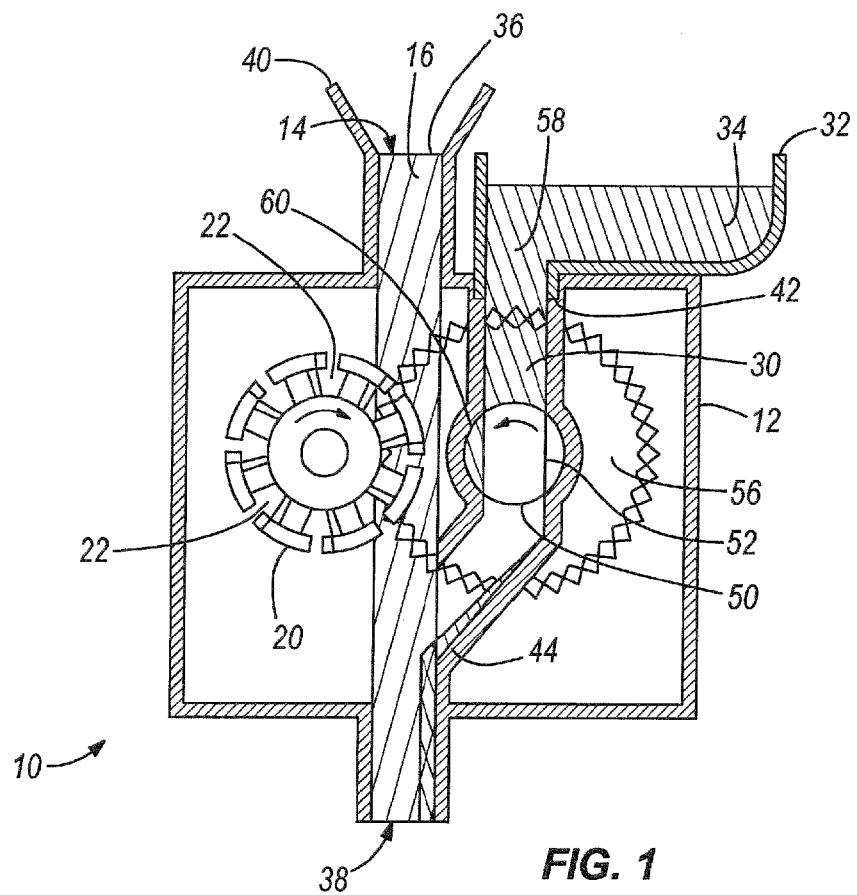
FIG. 1 is side cross-sectional view of one embodiment of a dispensing apparatus embodying aspects of the invention.
Figure 2:
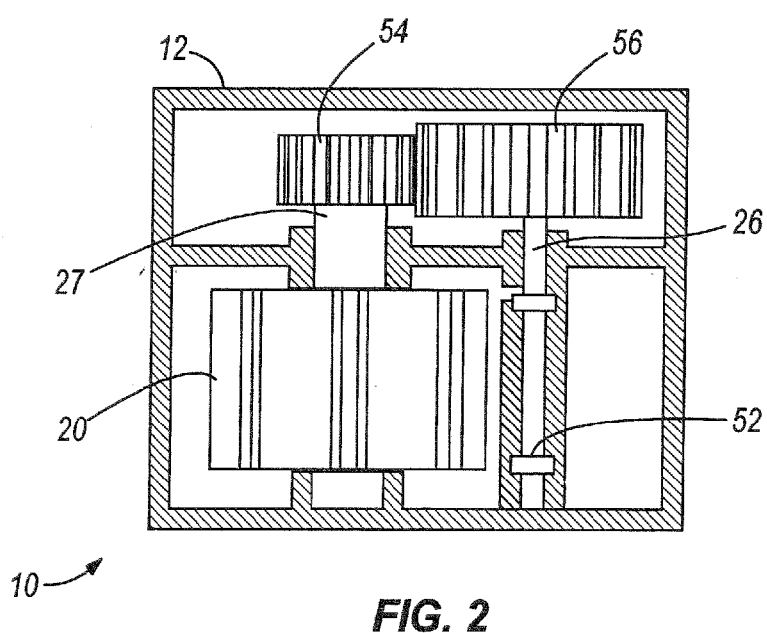
FIG. 2 is a top cross-sectional view of the embodiment shown in FIG. 1.

Referring to FIGS. 1 and 2, one particular embodiment of a dispensing apparatus 10 embodying aspects of the present invention is illustrated. The illustrated dispensing apparatus 10 provides a dilution control system that doses volumetrically. In other words, the dispensing apparatus 10 of this embodiment draws or otherwise delivers a concentrated chemical proportionally to the flow rate of a diluent passing through the dispensing apparatus 10 and into a container.

As illustrated, the dispensing apparatus 10 of this embodiment has a housing 12 at least partially defining a fluid passageway 14 adapted to receive a diluent 16 from a diluent source, such as a faucet, hose, pipe or other conduit, and the like. A wheel 20 with a horizontal axis is coupled to the housing 12 and in fluid communication with the fluid passageway 14. The wheel 20 has buckets, scoops, vanes, blades, floats, or other containers 22 located at its rim to contact diluent 16 passing through the fluid passageway 14. Diluent or water 16 flowing into or onto the buckets 22 provides power to dispense concentrated chemicals at an appropriate dilution ratio to the diluent 16 flowing into or onto the wheel 20. A shaft 26 is coupled to the housing 12 and the wheel 20 and adapted to rotate in response to rotation of the wheel 20. In this embodiment, at least a portion of the shaft 26 is positioned within a flow path 30 or reservoir 32 of a concentrated chemical 34 and is adapted to selectively dispense concentrated chemicals 34 into the diluent 16 or container via rotation of shaft 26.

Specifically, the illustrated housing 12 has a first flow path 14 for diluent 16, such as water, to pass through the housing 12. The flow path 14 through the housing 12 generally includes an inlet 36 and an outlet 38. Although it is not illustrated in FIG. 1, a funnel 40 can be located along or adjacent the flow path 14 to collect, gather, or focus the flow of diluent 16 from a diluent source. Generally, the diluent source will be a plumbed water source such as a faucet on a sink, a spigot, a hose or hose bib, and the like. However, in some embodiments, the diluent source can also be a reservoir or container of diluent 16 and/or tubing, piping, channels, or other conduits and valves extending there from.

As described in greater detail below, the diluent source can be directly coupled to the dispensing assembly 10 in some embodiments, while it can be placed in free flow fluid communication (i.e., not directly coupled) in other embodiments. In the directly coupled embodiments, the housing 12 can be directly connected or plumbed to the faucet or other diluent source to receive the diluent 16. Such an embodiment will be able to utilize the force, pressure, and speed of water flowing from the source to aid with dispensing. Additionally, such directly connected embodiments may utilize a back flow prevention device, such as valves, air gap devices, and the like, to comply with some plumbing codes. In the free flow embodiments, the funnel 40 described above can be utilized to capture diluent 16 flowing freely from the source. Although the pressure and speed of diluent 16 flowing through the dispensing assembly 10 can aid with dispensing, generally the weight of the diluent 16 accumulated in the funnel 40 or flow path 14 will drive the wheel 20.

Further, although it is not shown, the diluent 16 flowing through the housing 12 and out the outlet 38 can be received in a container, vessel, or other type of reservoir. In some embodiment, the diluent 16 is received in a sink compartment. In other embodiments, the diluent 16 can be received in a bucket, spray bottle, reservoir of a cleaning machine, and the like. In yet other embodiments, the diluent 16 may not be collected in a container. Rather, it may be directly dosed onto a floor or other surface, such as a counter top, wall, vehicle, window, animal carcass and the like.

As illustrated, the housing 12 also has a second flow path 30 for concentrated chemicals 34. The second flow path 30 has an inlet 42 that is coupled to a source of concentrated chemicals 34, such as a container, reservoir, or other connection from such devices, such as tubing or other conduits extending from a container. The outlet 44 of the second flow path 30 of this embodiment is co-terminus with the outlet 38 of the first flow path 14. In other words, as shown in FIG. 1, the second flow path 30 intersects and feeds into the first flow path 14 inside the housing 12. In other embodiments, however, the second flow path 30 can have its own distinct outlet. In the illustrated embodiment, the co-terminus outlet can help prevent concentrated chemicals from contacting people or objects adjacent the dispenser by causing the concentrated chemicals to mix with the diluent 16 prior to exiting the housing 12.

In the embodiment illustrated in FIG. 1, a reservoir 32 of chemicals 34 is positioned above and in fluid communication with the second passageway or flow path. Due to this arrangement, the concentrated chemicals 34 are gravity fed into the flow path 30. However, as described in greater detail below, in some embodiments, a pump or other device can be used to deliver the chemicals to the flow path or otherwise into the diluent 16.

As indicated above, a wheel 20 is coupled to the housing 12 and in fluid communication with the diluent flow path 14.

The wheel 20 can be configured in a variety of different manners, as exemplified in several figures. In general, the wheel 20 can have a central hub, spindle, or shaft with a plurality of vanes, buckets, containers, floats, or blades 22 extending there from, much like a water wheel, turbine, or paddle wheel. The wheel 20 generally operates as a rotary power unit driven by the impact of, weight, or reaction from a flow stream of fluid on the blades, buckets, containers, or vanes 22 of the wheel 20. The wheel 20 harnesses the power of flowing diluent 16 and provides power to other structures or elements for dispensing concentrated chemicals 34.

As illustrated in this embodiment, the wheel 20 is fully contained within the housing 12. However, in other embodiment, one or more portions of the wheel 20 can be exposed outside of the housing 12. A portion of the wheel 20 is located in the diluent flow path 14. More specifically, the wheel 20 can be positioned in the flow path 14 to substantially block or interrupt all flow of diluent 16 through the flow path 14. As such, substantially all diluent 16 flowing through the flow path 14 drives the wheel 20 to provide maximum power. Additionally, with such a configuration, the amount of diluent 16 passing through the flow path 14 can be measured by the number of scoops, buckets, etc. 22 filled on the wheel 20 or by the number of rotations of the wheel 20. The rotation of the wheel 20 can be proportionately coupled to the dispense of concentrated chemical 34.

As best shown in FIG. 2, the wheel 20 is coupled to a rotary metering device 50 in the concentrated chemical flow path 30. Specifically, the wheel 20 is coupled to a shaft 27 which is coupled to a gear 54. In some embodiments, the wheel 20 is integrally formed with one or more of the shaft 27 and/or the gear 54. This gear 54 is coupled to a second gear 56 which is in-turn coupled to a second shaft 26. The second shaft 26 is coupled to the rotary metering device 50. More specifically, in the illustrated embodiment, the second shaft 26 is integrally formed with the rotary metering device 50. In some embodiments, the second gear 56, second shaft 26, and the rotary metering device 50 can be integrally formed. Furthermore, as illustrated in this embodiment, the wheel 20, the shafts, the gears, and the rotary metering device can all be contained within the housing 12.

Figure 3:
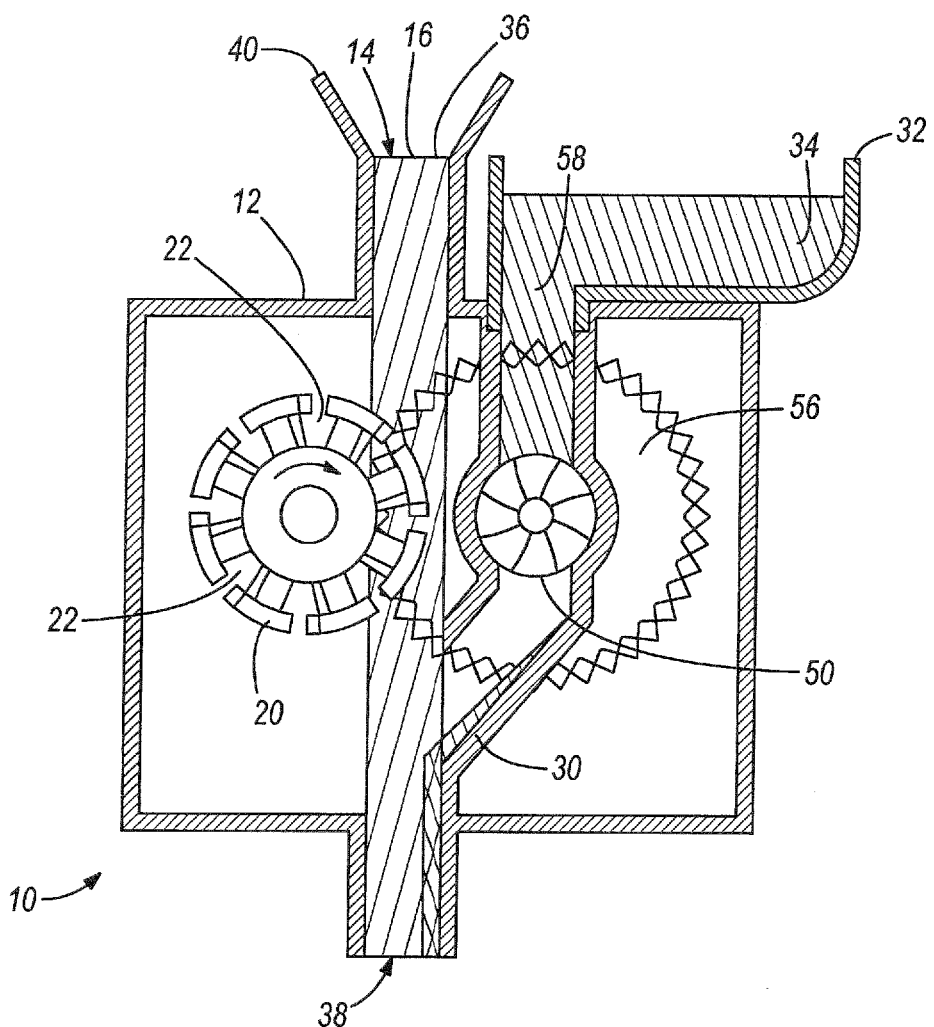
FIG. 3 is a side cross-section view of a second embodiment of a dispensing apparatus embodying aspects of the present invention.

The rotary metering device 50 of this embodiment includes two flattened sections 52 on a shaft 26. However, in other embodiments, the rotary metering device 50 can be a water wheel, paddle wheel, or turbine type device, such as is shown in FIG. 3. Additionally, the rotary metering device 50 can also comprise one or more apertures in or through the shaft 26. Referring to the embodiment shown in FIG. 1, the rotary metering device 50 is located in an aperture 58 located at the base of the concentrated chemical reservoir 32. More specifically, the rotary metering device 50 is located in a conduit or passageway 30 extending from the reservoir 32. Generally, the rotary metering device 50 can have at least two positions. In the first position, the rotary metering device 50 prevents concentrated chemical from flowing through the passageway 30. In another position, it allows a specific quantity of chemical to be dispensed or moved to a position where it can be dispensed. The flattened sections 52 of this embodiment of the rotary metering device 50 allow a predetermined amount of concentrated chemical 34 to be dosed per rotation of the shaft 26 or per rotation of the wheel 20. Specifically, when the flatted portion 52 is in a specific position, concentrate 34 can flow into an aperture 60 defined by the flow path housing 12 and shaft 26. Rotation of the shaft 26 eventually prevents further communication of this aperture 60 and the reservoir 32. Even further rotation of the shaft 26 places the aperture 60 (and captured chemicals) into communication with the remainder of the flow path 30—allowing the chemical to be dispensed. Accordingly, through the use of a metering device 50 coupled to the wheel 20, the concentrated chemical 34 can be dispensed volumetrically and in proportion to the amount of diluent 16 dispensed.

The amount of concentrated chemical 34 dispensed per unit of diluent 16 can be controlled many ways in the embodiment illustrated in FIG. 1. One particular way of controlling the amount of concentrated chemical 34 dispensed is by controlling the size and configuration of the rotary metering device 50. Specifically, with reference to FIG. 1, this can be controlled by altering the size or shape of the flattened portion 52 of the second shaft 26. Additionally, this can be controlled by altering the shape of the housing 12 defining the flow path adjacent the rotary metering device 50. Also, this can be controlled by adjusting the gear ratio of the first gear to the second gear. This can alter the number of rotations of the second shaft 26 relative to each rotation of the first shaft 26. By altering these features, the dilution ratio of diluent 16 to concentrated chemical can be a ratio of about 1:1 or less to a ratio of about at least 3000:1 or more. Note that the viscosity of the concentrated chemical can also be a controlling factor relative to the dilution ratio.

Operation of the embodiment illustrated in FIG. 1 will now be described. A concentrated chemical 34 is provided in the reservoir 32 and a diluent source is provided to the dispensing assembly 10. Again, the diluent 16 can be directly connected to the dispensing assembly 10 or it can freely flow (i.e., air gap between the source and the dispensing assembly) to the dispensing assembly 10. In the free flow configuration, diluent 16 can be captured in the funnel 40 that is in communication with the flow path 14. Accumulated diluent 16 in the funnel 40 can then flow into the flow path 14 where it will come into contact with the wheel 20 and fill one or more buckets or containers in the wheel 20. The weight of the diluent 16 against the wheel 20 will cause rotation of the wheel 20.

Rotation of the wheel 20 allows a measured amount of diluent 16 to flow through the flow path 14 per rotation of the wheel 20. Specifically, the volume of each bucket 22 is known and the number of buckets 22 filled and dumped per rotation is known. Accordingly, the amount of diluent 16 passing through the flow path 14 per rotation is known.

Rotation of the wheel 20 also causes the rotary metering device 50 in the concentrated chemical flow path 30 to rotate and dispense chemical 34 at a predetermined dilution ratio. Specifically, rotation of the wheel 20 causes the first shaft 27 to rotate, which causes the first gear 54 to rotate. The first gear 54 drives the second gear 56, which in-turn rotates the second shaft 26. Rotation of the second shaft 26 causes the rotary metering device 50 to dispense chemicals 34 from the concentrated chemical flow path 30.

In the illustrated embodiment of FIG. 1, concentrated chemicals 34 are delivered to the chemical flow path 30 and the rotary metering device 50 via gravity. Rotation of the rotary metering device 50 allows a predetermined amount of chemical 34 to be dispensed into the diluent 16. As shown in the drawings, the concentrated chemical 34 mixes with the diluent 16 inside the housing 12 in this embodiment.

As shown and briefly described above, the embodiment illustrated in FIG. 3 is configured and operates substantially the same as the embodiment shown in FIG. 1. Accordingly, the construction and operation of this device will not be described in detail rather only the major differences in construction will be described.

As illustrated in FIG. 3, the only significant difference in construction of this embodiment relative to FIG. 1 is with regard to the rotary metering device 50. Specifically, the rotary metering device 50 of this embodiment is a water wheel, paddle wheel, or turbine type device, opposed to the flattened shaft illustrated in FIG. 1, that is driven by a shaft and gear arrangement similar to that shown in FIG. 2. As will the previous embodiment, the size, shape, number, and configuration of this wheel 20 type device can at least partially control the amount of concentrated chemical dispensed per rotation.

Figure 4:
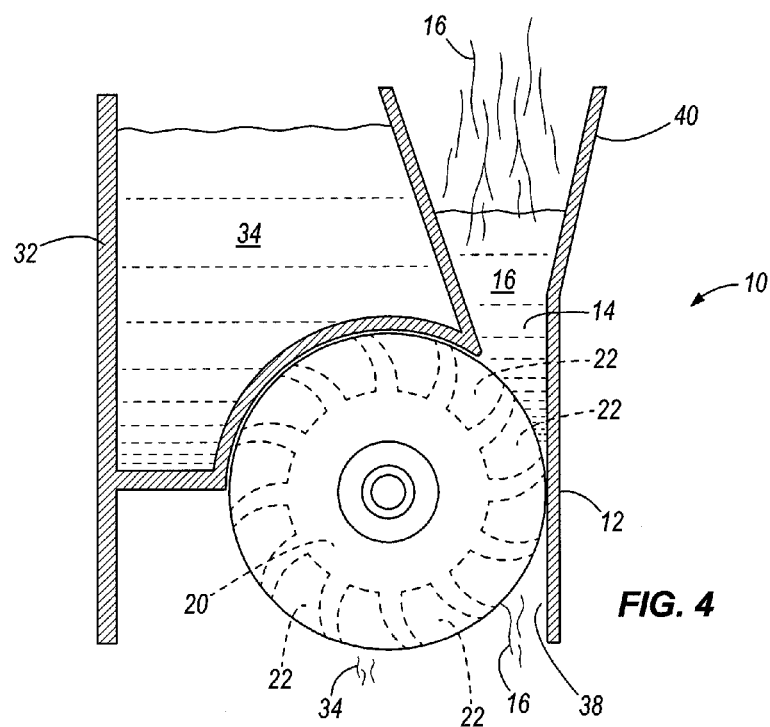
FIG. 4 is a side cross-section view of a third embodiment of a dispensing apparatus embodying aspects of the present invention.
Figure 5:
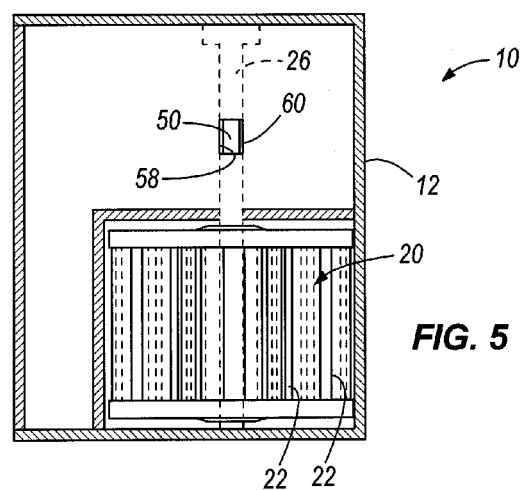
FIG. 5 is a top cross-sectional view of the embodiment shown in FIG. 4.

FIGS. 4 and 5 illustrate another embodiment of a dispensing assembly 10 embodying aspects of the present invention. This embodiment is configured and operates in a similar manner to the embodiment shown in FIG. 1. Accordingly, the construction and operation of this device will not be described in detail rather only the major differences in construction will be described.

As shown in the figures, this embodiment has a housing 12 that at least partially defines a diluent flow path 14 and at least partially contains a wheel 20 in fluid communication with the diluent flow path 14. The housing 12 of this embodiment also includes a chemical reservoir 32. As illustrated, the chemical reservoir 32 of the illustrated embodiment is positioned adjacent the wheel 20. As best illustrated in FIG. 5, the chemical reservoir 32 includes an aperture 58 positioned in the base of the chemical reservoir 32. Preferably, the aperture 58 is located at the lowest point in the reservoir 32 so that the entire reservoir 32 can be emptied via gravitational forces. A shaft 26 coupled to the wheel 20 is positioned adjacent the aperture 58 to selectively dispense chemicals 34 from the reservoir 32. More specifically, a rotary metering device 50 coupled to the shaft 26 can be positioned in or adjacent the aperture 58 to selectively open and close the aperture 58 or otherwise dispense chemical through the aperture 58. As noted above, the shaft 26 can be position within a passageway that is in communication with the reservoir 32 via the aperture 58.

In this particular embodiment, the shaft 26 is directly driven by the wheel 20. Accordingly, dilution control is achieved by controlling the size of the aperture 58 and/or size and configuration of the rotary metering device 50. In other words, a set of gears or other transmission assembly is not included in this embodiment. As such, this means of controlling the dilution ratio is not available. However, in other embodiments, additional shafts and transmission assemblies can be utilized to control the frequency of allowing the chemical to dispense via the aperture.

Although the chemical reservoir 32 of this embodiment is shown as being integral with the housing 12, in other embodiments, the chemical reservoir 32 can be coupled to the housing in other manners. For example, the chemical reservoir 32 can be coupled to the housing 12 via conduits. Additionally, in some embodiments, the housing 12 can directly receive a bottle containing the concentrated chemicals.

The operation of the embodiment shown in FIGS. 4 and 5 will now be described. A concentrated chemical 34 is provided in the reservoir 32 and a diluent source is provided to the dispensing assembly 10. Again, the diluent 16 can be directly connected to the dispensing assembly 10 or it can freely flow (i.e., air gap between the source and the dispensing assembly) to the dispensing assembly 10. In the free flow configuration, diluent 16 can be captured in the funnel 40 that is in communication with the flow path 14. Accumulated diluent 16 in the funnel 40 can then flow into the flow path 14 where it will come into contact with the wheel 20 and fill one or more buckets 22 in the wheel 20. The weight of the diluent 16 against the wheel 20 will cause rotation of the wheel 20.

As described in previous embodiments, rotation of the wheel 20 allows a measured amount of diluent 16 to flow through the flow path 14 per rotation of the wheel 20. Rotation of the wheel 20 also causes the rotary metering device 50 in communication with the concentrated chemical 34 to rotate and dispense chemical 34 at a predetermined dilution ratio. Specifically, rotation of the wheel 20 causes the shaft 26 to rotate, which then causes the rotary metering device 50 to rotate and dispense chemicals from the concentrated chemical flow path 30 or reservoir 32.

The embodiments described above at least partially work under a different principle than the embodiments shown in FIG. 6-9. The embodiments shown in FIGS. 1-5 generally operate under a gravitational feed principle. In other words, concentrated chemicals 34 are delivered from a reservoir 32 of concentrated chemicals 34 to the diluent 16 via gravity. Further, gravity delivers the concentrated chemicals 34 to the rotary metering device 50. Then, rotation of the rotary metering device 50 allows a predetermined amount of chemical 34 to be dispensed. The embodiments illustrated in FIGS. 6-9 operate via a pumping principle. In other words, a pump 62 is utilized to dispense the concentrated chemical 34 from a reservoir 34 of concentrated chemical 34. The pump is some embodiments can overcome gravitational forces, while the pump in other embodiments can work in conjunction with gravitational forces. For example, in some embodiments, the chemical reservoir or portions thereof may be positioned below the pump or the dispensing outlet of the concentrated chemicals. Accordingly, gravity must be overcome by the pump. In one particular example, the pump draws chemical from a dip tube positioned in a reservoir. However, in some embodiments, the pump may be positioned such that concentrated chemicals are delivered to the pump via gravitation feed and the pump must deliver the concentrated chemicals against the force of gravity to an outlet.

Figure 6:
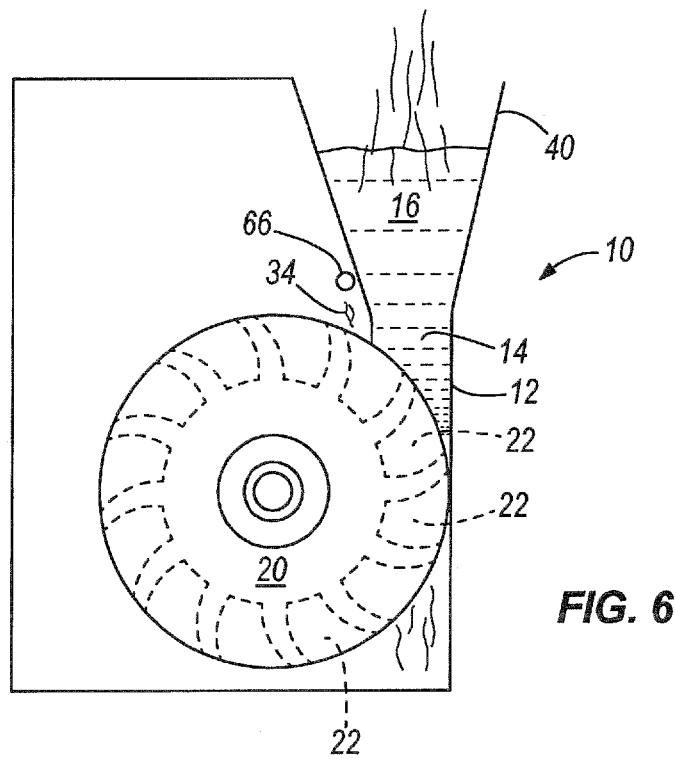
FIG. 6 is a side cross-section view of a fourth embodiment of a dispensing apparatus embodying aspects of the present invention.
Figure 7:
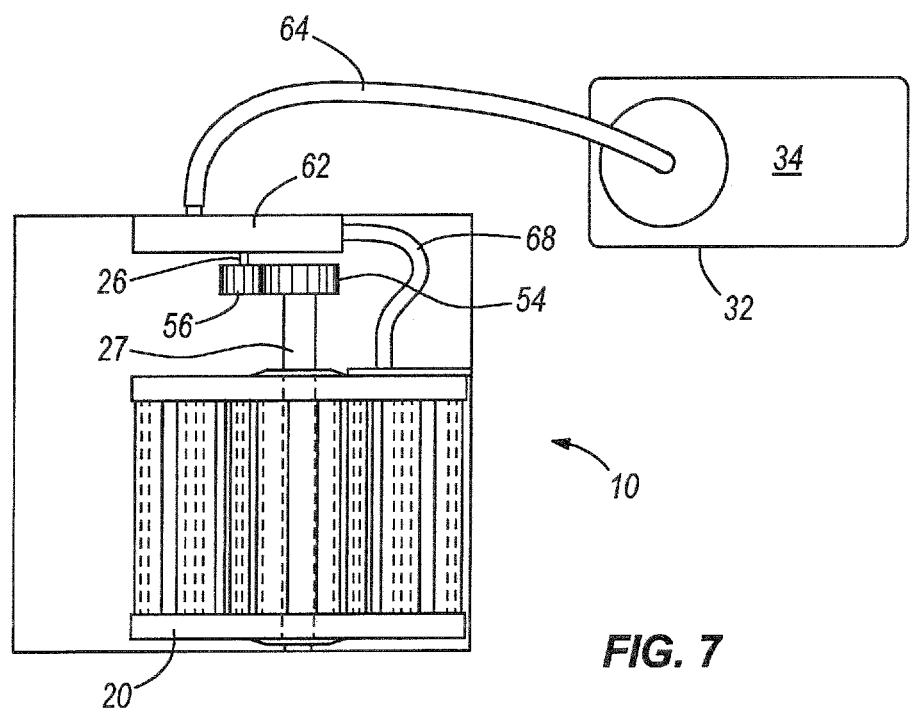
FIG. 7 is a first top cross-sectional view of the embodiment shown in FIG. 6.

FIGS. 6 and 7 illustrate one particular embodiment of a dispensing assembly 10 embodying inventive aspects. This embodiment has many features in common with the previously described embodiments. Accordingly, many of the common features will not be discussed in detail. Rather, one must refer to the description previously provided for a better understanding of some of the common features. Generally, only the new or different features of this embodiment will be discussed in detail.

The embodiment illustrated in FIGS. 6 and 7 includes a housing 12 that has a fluid passageway 14 and a turbine, water wheel, or paddle wheel type device 20 and a pump 62 coupled to the housing 12. Like the previous embodiments, the housing 12 of this embodiment at least partially defines a fluid passageway or flow path 14 adapted to receive a diluent 16, such as water, from a diluent source. The flow path 14 through the housing 12 generally includes an inlet 36 and an outlet 38. As illustrated, a funnel 40 can be located along or adjacent the flow path 14 to collect, gather, or focus the flow of diluent 16 from a diluent source.

As indicated above, a wheel 20 is coupled to the housing 12 and in fluid communication with the diluent flow path 14. The wheel 20 can be configured in a variety of different manners, as exemplified in several figures and discussed above. A portion of the wheel 20 is located in the diluent flow path 14. More specifically, the wheel 20 can be positioned in the flow path 14 to substantially block or interrupt all flow of diluent 16 through the flow path 14. Diluent 16 contacting the wheel 20 imparts power to the wheel 20 which is used to drive or actuate a pump 62 to dispense concentrated chemical 34.

The pump 62 is in fluid communication with a reservoir 32 containing a concentrated chemical 34. Actuation of the pump 62 delivers concentrated chemicals 34 to diluent 16 flowing through the fluid passageway or flow path 14. As best shown in FIG. 7, the wheel 20 is coupled to a shaft 27 which is coupled to a gear 54. This gear 54 is coupled to a second gear 56 which is coupled to a second shaft 26. The second shaft 26 is coupled to the pump device 62. In some embodiments, the pump 62 can be directly coupled to the wheel 20, such as with the shaft extending from the wheel 20. Accordingly, the gears and second shaft would be eliminated in such an embodiment. In yet other embodiments, additional gears, shafts, and other structures can be included between the wheel 20 and the pump to provide an appropriate dilution ratio.

Although substantially any pump can be utilized (for select dilution ratios), preferably a positive displacement pump is utilized. For example, in some embodiments, a gear pump, piston pump, diaphragm pump, rotary vane pump, and the like can be used. Further, in some embodiments, centrifugal pumps may be able to be utilized.

A variety of items can be varied to accurately control the dilution ratio. For example, if gears are utilized to transmit power from the wheel 20 to the pump 62, the gear ratio can be selected to provide the proper dilution ratio. Further, the configuration, capacity, and size of the pump 62 can be selected to provide dilution control. Note that the viscosity of the concentrated chemical can also be a controlling factor relative to the dilution ratio.

Figure 8:
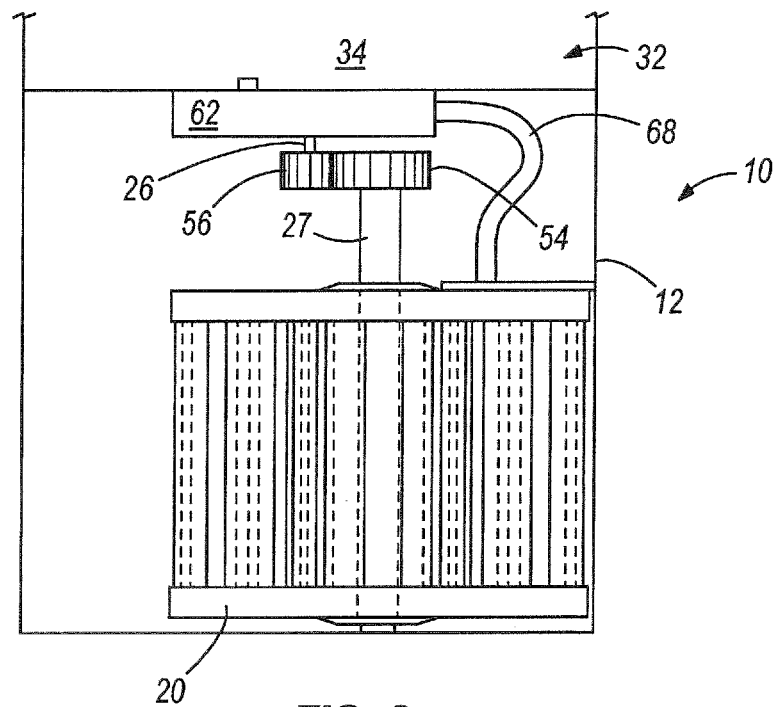
FIG. 8 is an alternative top cross-sectional view of the embodiment shown in FIG. 6.

As illustrated in FIG. 7, the pump 62 can draw concentrated chemicals from a concentrated chemical reservoir 32 that is located remotely from the housing 12. In other words, the reservoir 32 is not directly connected to housing 12. Rather, the reservoir 32 is connected to the housing 12 and pump 62 via a conduit 64, such as tubing, extending between the pump 62 and the reservoir 32. Concentrated chemical 34 can be drawn from the reservoir 32 during operation of the pump 62 via the conduit 64. Alternatively, as shown in FIG. 8, the reservoir 32 can be coupled or integrally formed with the housing 12. Further, the inlet to the pump 62 can be placed in communication with the reservoir. Preferably, the inlet is placed at the lowest position within the reservoir to allow substantially all of the concentrated chemicals to be gravity fed to the pump.

Concentrated chemicals 34 can be pumped to a variety of locations within the housing 12. However, in the illustrated embodiment, the concentrated chemicals are pumped to an aperture 66 positioned above or adjacent the wheel 20. As such, the concentrated chemicals 34 are dispensed onto the wheel 20 wherein they mix with the diluent 16 prior to exiting the housing 12. Additionally, with such as configuration, the flow of diluent 16 into the wheel 20 can cause some agitation to cause the concentrated chemical 34 to foam in the diluent 16, which may be desirable in some circumstances. As illustrated, the chemicals 34 are delivered from the pump 62 to the wheel 20 via a conduit 68. However, in other embodiments, the pump can be positioned within the housing 12 such that the conduit may not be necessary. Furthermore, in some embodiments, it may not be desirable to dispense the chemicals onto the wheel 20. Accordingly, the pump outlet (or any conduit extending there from) can be directed elsewhere.

As discussed above, the dispensing apparatus 10 can be configured to adjust foaming of the chemical. For example, the dispensing apparatus can be configured as discussed in the previous paragraph to enhance foaming. However, in other embodiments, the apparatus can be specifically configured to minimize agitation and resulting foaming. In embodiments where foaming is desired, the wheel 20 can be provided with additional fins, projections, recesses, apertures, and the like to cause additional agitation or otherwise produce additional foam.

Operation of the embodiment illustrated in FIG. 7 will now be described. A concentrated chemical 34 is provided in the reservoir 32 and a diluent source is provided to the dispensing assembly 10. Again, the diluent 16 can be directly connected to the dispensing assembly 10 or it can freely flow (i.e., air gap between the source and the dispensing assembly) to the dispensing assembly 10. In the free flow configuration, diluent 16 can be captured in the funnel 40 that is in communication with the flow path 14. Accumulated diluent 16 in the funnel 40 can then flow into the flow path 14 where it will come into contact with the wheel 20 and fill one or more buckets in the wheel 20. The weight of the diluent 16 against the wheel 20 will cause rotation of the wheel 20.

Rotation of the wheel 20 allows a measured amount of diluent 16 to flow through the flow path 14 per rotation of the wheel 20. Specifically, the volume of each bucket 22 is known and the number of buckets 22 filled and dumped per rotation is known. Accordingly, the amount of diluent 16 passing through the flow path 14 per rotation is known.

Rotation of the wheel 20 also causes actuation of the pump 62 as discussed above to deliver concentrated chemicals to the diluent 16. Specifically, in the illustrated embodiment, rotation of the wheel 20 causes the first shaft 27 to rotate, which causes the first gear 54 to rotate. The first gear 56 drives the second gear 26, which in-turn rotates the second shaft 26. Rotation of the second shaft 26 causes the pump 62 to dispense chemicals from the concentrated chemical reservoir 32. The concentrate 34 is delivered to the top of the wheel 20 and mixed with diluent 16 in the wheel 20. The mixing in the wheel 20 can cause foam to form in the mixture via agitation in the wheel 20.

Figure 9:
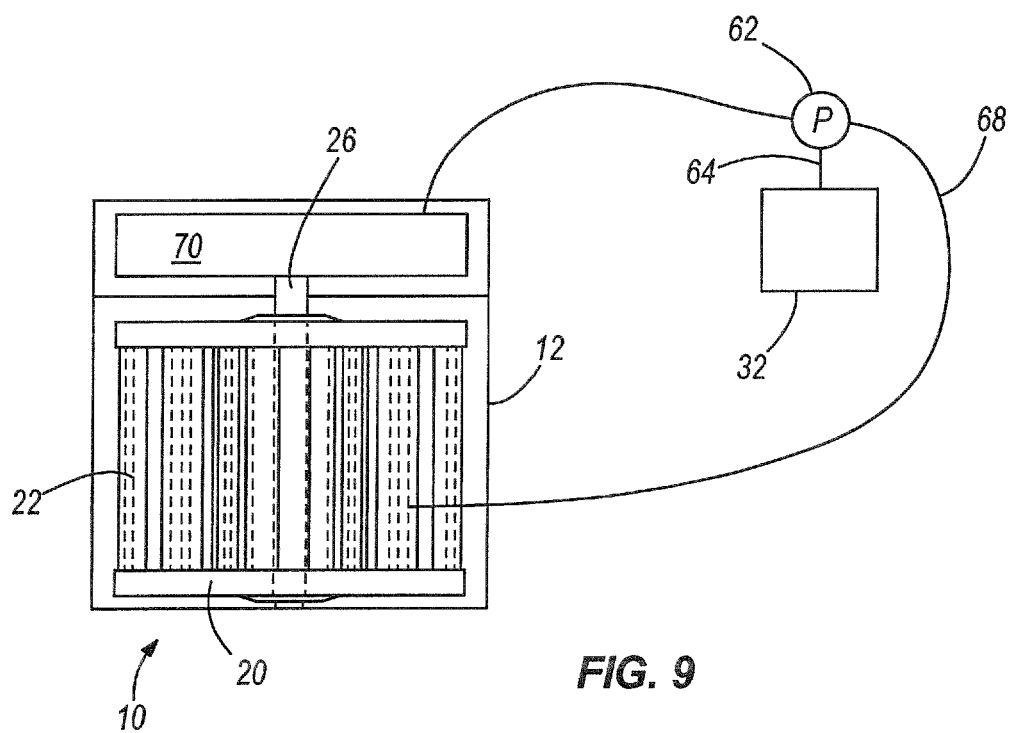
FIG. 9 is a top schematic view of another embodiment of a dispensing apparatus embodying aspects of the present invention.

FIG. 9 is yet another embodiment of a dispensing assembly 10 embodying inventive aspects. Like the previous embodiment, this embodiment utilizes a pump 62 to deliver the concentrated chemical 34 to the diluent 16. However, unlike the previous embodiment which used purely mechanical power to operate the pump 62, this embodiment utilizes an electrical generator 70 to power the pump 62. As described below, the electrical generator 70 is driven by a turbine or wheel type device 20. As can be seen in the figures and understood in the description provided below, this embodiment has many features in common with the previously described embodiments. Accordingly, many of the common features will not be discussed in detail. Rather, one must refer to the description previously provided for a better understanding of some of the common features. Generally, only the new or different features of this embodiment will be discussed in detail.

The embodiment illustrated in FIG. 9 includes a housing 12 that has a fluid passageway 14 and a turbine or wheel type device 20 coupled to the housing 12. Like the previous embodiments, the housing 12 of this embodiment at least partially defines a fluid passageway 14 adapted to receive a diluent 16 from a diluent source. The flow path 14 through the housing 12 generally includes an inlet and an outlet. A funnel can be located along or adjacent the flow path 14 to collect, gather, or focus the flow of diluent 16 from a diluent source in a free flow configuration. However, the diluent source can preferably be directly coupled to the dispensing assembly to take advantage of the pressure and velocity of diluent 16 exiting the diluent source.

As indicated above, a wheel 20 is coupled to the housing 12 and in fluid communication with the diluent flow path 14. The wheel 20 can be configured in a variety of different manners, as exemplified in several figures and discussed above. A portion of the wheel 20 is located in the diluent flow path 14. More specifically, the wheel 20 can be positioned in the flow path 14 to substantially block or interrupt all flow of diluent 16 through the flow path 14. With such a configuration, the full mechanical advantage of the diluent source can be harnessed and the amount of diluent 16 passing through the flow path 14 can be measured by the number of scoops, buckets, etc. 22 filled on the wheel 20 or the number of rotations of the wheel 20. As discussed in greater detail herein, by knowing the amount of diluent 16 passing by wheel 20, concentrated chemical 34 can be proportionately coupled to the rotation of the wheel 20.

An electrical generator 70 is coupled to and driven by the wheel 20. Rotation of the wheel 20 causes rotation of the generator 70 (more specifically, a rotor relative to a stator). Rotation of the generator 70 causes electricity to be generated. This generated electricity is then used to power a pump 62, which delivers concentrate to the diluent 16.

The pump 62 is in electrical communication with the generator 70 and in fluid communication with a reservoir 32 containing a concentrated chemical 34. The pump 62 can be positioned adjacent the reservoir 32 or placed remotely relative to the reservoir 32. In some embodiments, the pump 62 is contained within the housing 12 and coupled to the reservoir 32, which is located remotely relative to the housing 12, via a conduit 64. In other embodiments, the pump 62 is coupled to the reservoir 32, which is located remotely relative to the housing 12, and delivers chemical to the housing 12 via a conduit 68. In yet other embodiment, the pump 62 and reservoir 32 can be integrally formed with or directly coupled to the housing 12.

The pump 62 can be triggered and actuated many ways. In some embodiments, the pump 62 is actuated when an electric current is received from the generator 70. In other embodiments, the pump 62 is actuated when a trigger signal is received from the wheel 20, housing 12, or generator 70. Additionally, the pump 62 can be triggered to pump for limited period of time based upon the number of rotations of the wheel 20 or it can be modulated on and off a select number of times per rotation of the wheel 20.

As described above, the pump 62 can be configured and sized to provide a predetermined dilution ratio.

Operation of the embodiment illustrated in FIG. 9 will now be described. A concentrated chemical 34 is provided in the reservoir 32 and a diluent source is provided to the dispensing assembly 10. Again, the diluent 16 can be directly connected to the dispensing assembly 10 or it can freely flow (i.e., air gap between the source and the dispensing assembly) to the dispensing assembly 10. In the direct connection configuration, the housing 12 can be directly coupled to the diluent source, such as a faucet. For example, the threaded connection or quick connect device can be used to connect the housing 12 to the diluent 16 source. With the diluent source turned on, diluent 16 can flow into the flow path 14 where it will come into contact with the wheel 20 and fill one or more buckets 22 in the wheel 20. The weight of the diluent 16 against the wheel 20 will cause rotation of the wheel 20. Additionally, the pressure of the diluent source and the velocity of diluent 16 from the diluent source can drive the wheel 20.

Rotation of the wheel 20 drives the electrical generator 70, which causes electricity to be generated. This electricity is then used to power the pump 62, which delivers concentrated chemicals 34 from the reservoir 32 to the diluent 16. As described above, the pump can be sized, configured, and operated to deliver a proper amount of concentrate to the diluent 16 per unit of diluent 16 passing through the wheel 20. The concentrate 34 can be delivered to the top of the wheel 20 and mixed with diluent 16 in the wheel 20. The mixing in the wheel 20 can cause foam to form in the mixture via agitation in the wheel 20.

Figure 10:
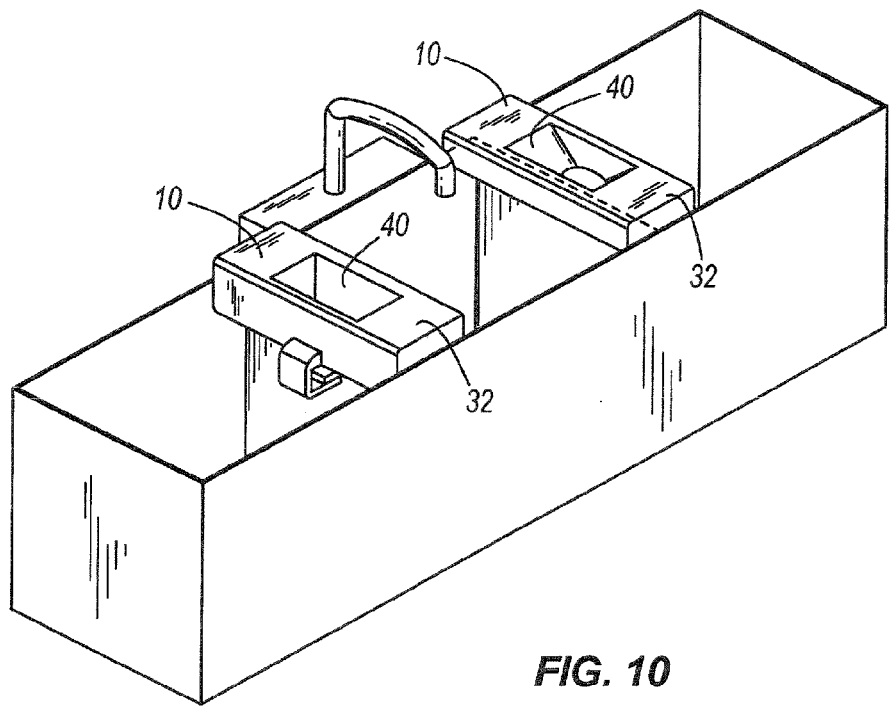
FIG. 10 is a perspective view of dispensing apparatuses embodying aspects of the present invention coupled to dividers of a sink.
Figure 11:
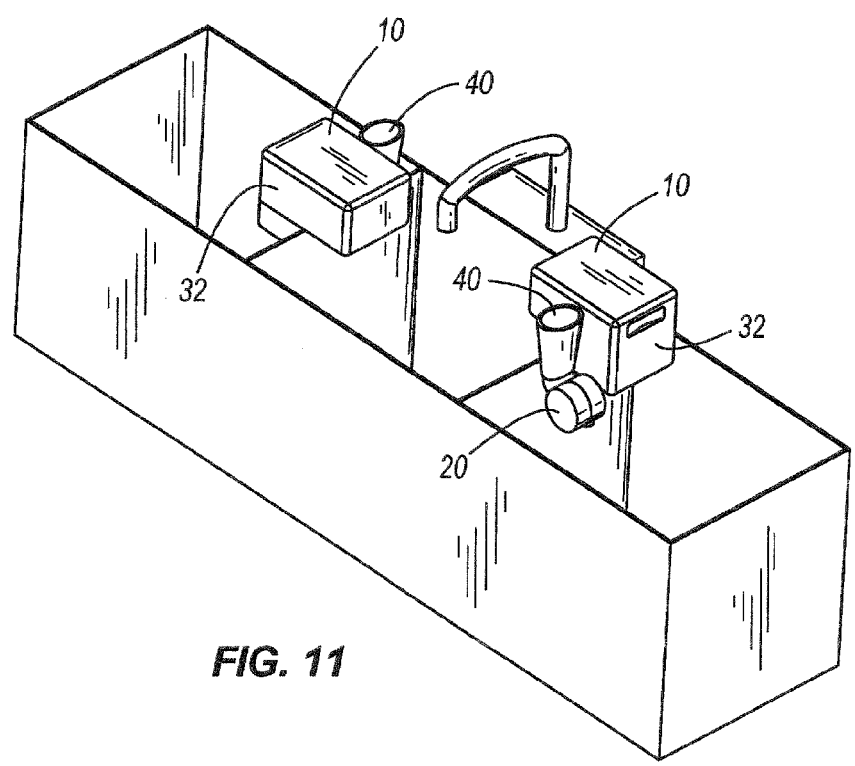
FIG. 11 is a perspective view of dispensing apparatuses embodying aspects of the present invention coupled to dividers of a sink.
Figure 14:
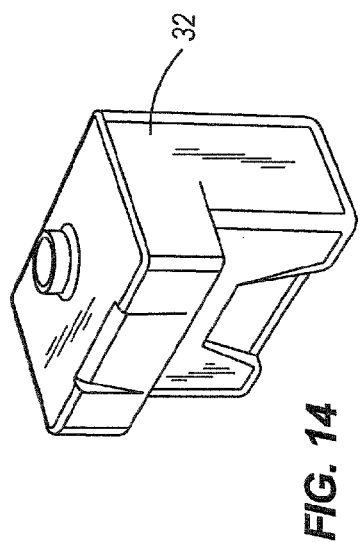
FIG. 14 is a perspective view of a container or bottle forming part of the dispensing apparatus shown FIG. 12.
Figure 13:
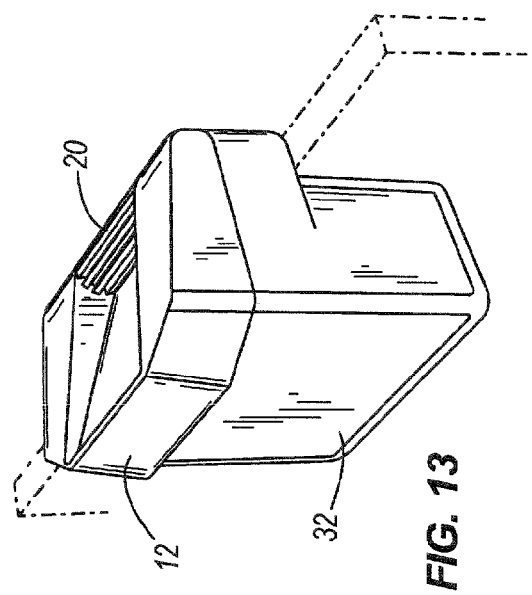
FIG. 13 is another perspective view of the embodiment shown in FIG. 12.
Figure 12:
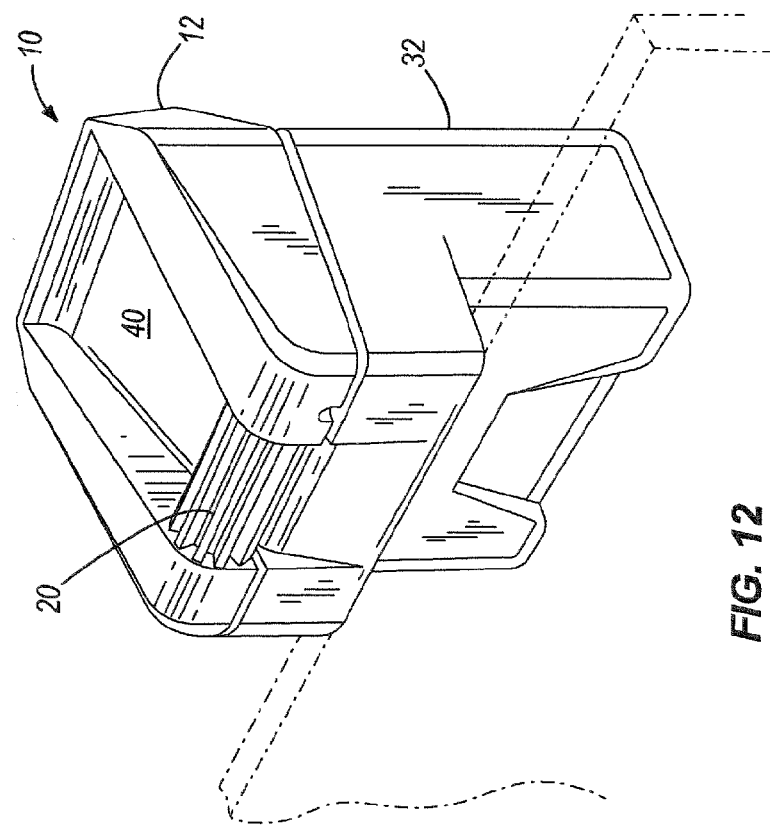
Figure 16:
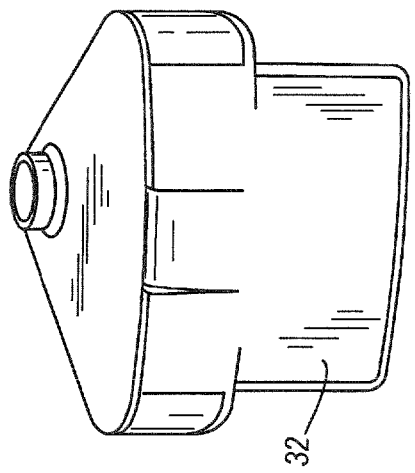
FIG. 16 is a perspective view of a container or bottle forming part of the dispensing apparatus shown FIG. 15.
Figure 15:
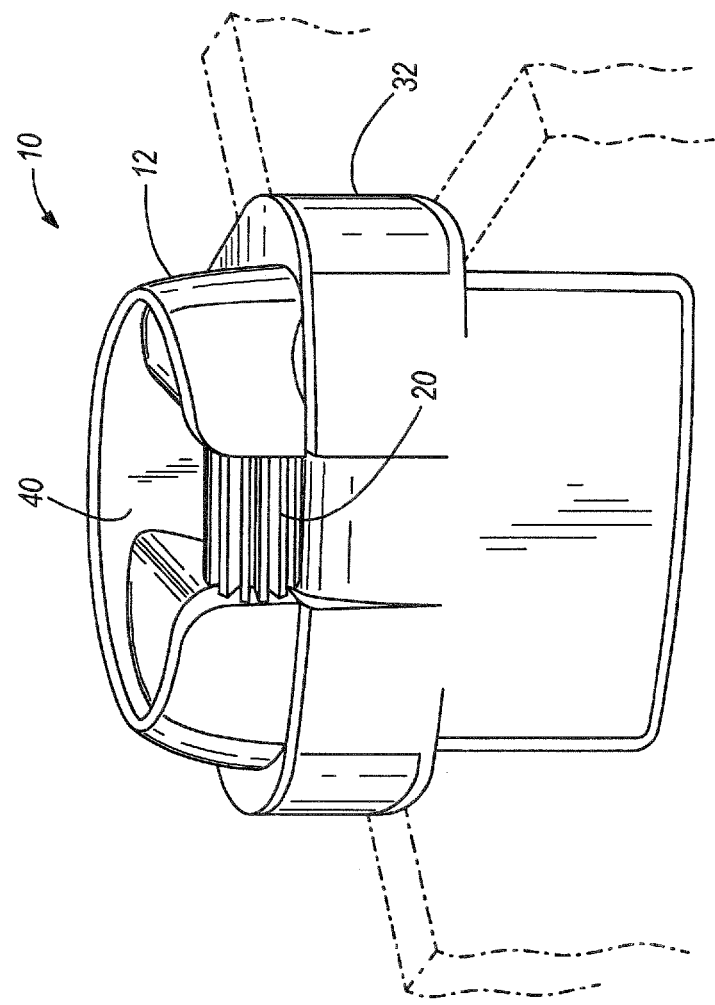

FIGS. 10 and 11 illustrate alternative configurations for a dispensing assembly embodying inventive aspects. The embodiments illustrated in these figures are configured to be received on a divider of a sink or multi-compartment sink. Accordingly, the housing 12 is provided with an attaching mechanism to connect the housing 12 to the sink. In some embodiments, the attaching mechanism is a hook-like structure that straddles the wall of the sink. The hook-like structure can have a fixed sized opening or an adjustable opening to fit on a variety of different wall thicknesses. Alternatively, as shown in other figures, the housing 12 can be provided with a ledge to rest and balance on an edge of the sink. In some embodiments, other attaching means can be used such as adhesive, suction cups, hook and loop fasteners, and the like. Additionally, structures can be provided on the sink to receive and hold one or more portions of the dispensing assembly. Further, as described above, the housing 12 can be directly coupled to the faucet.

In the embodiments illustrated in FIGS. 10 and 11, the dispensing assembly can be placed in or on the sink when in use and moved to another location for storage when not is use. Although a sink is described and illustrated with respect to this embodiment, the dispensing assembly can be used in other areas, as described above. For example, the dispensing assembly can be coupled to the wall of a bucket to fill the bucket or it can be coupled to the reservoir of the floor cleaning machine to fill the reservoir. Alternatively, the dispensing assembly can be coupled to a wall and configured to dispense into small containers, such as spray bottles.

FIGS. 12-16 illustrate other configurations of a dispensing assembly embodying inventive aspects. These embodiments include a container adapted for use as a concentrated chemical reservoir, wherein the container directly couples to the dispenser housing 12. In other words, the wheel 20 and pump is contained in the dispenser housing 12 and a dip tube extends into the chemical reservoir located below the dispenser housing 12 to draw concentrate from the reservoir. In some embodiments, the dispenser housing 12 and chemical reservoir can be configured differently such that the dispenser housing 12 (or substantial portions of it) are received within the separable container used as the concentrated chemical reservoir.

Although it is not specifically described above, some embodiments can dispense concentrated chemicals in a variety of forms. For example, in some embodiments, the concentrate in a concentrated cleaning chemical in liquid form. In other embodiments, the concentrate is in solid or powder form. In these later embodiments, various metering devices and techniques can be used. For example, with a solid, water can flow via the aid of gravity from the diluent source directly over the solid and drain from the housing via the assistance of gravity. The solid product can be selected or arranged to dissolve at a predetermined rate corresponding to the flow of diluent to provide the correct dilution ratio. In such situation, the flow of diluent can be controlled with a wheel, valve, controlled aperture, tortured pathways, and the like. Further, the solid product can be impregnated or encapsulated on the wheel and be selected to dissolve at a predetermined rate. In such situations, the solid product can be a concentrated cleaning chemical, a water softening chemical, and the like. With a powder chemical configuration, the paddle wheel can be configured to drive a dispensing closure, such as illustrated in U.S. Patent Publication Number 2005/0247742 entitled "Metering and Dispensing Closure," the entire contents of which are hereby incorporated by reference. Alternatively, a controlled amount of the diluent can be flushed against a powder interface within the dispenser to provide a proper dilution ratio to the flow of diluent. The amount of diluent contacting the powder can be controlled by a wheel, a valve, controlled aperture, tortured pathways, diversions in flow paths, and the like.

Figure 17A:
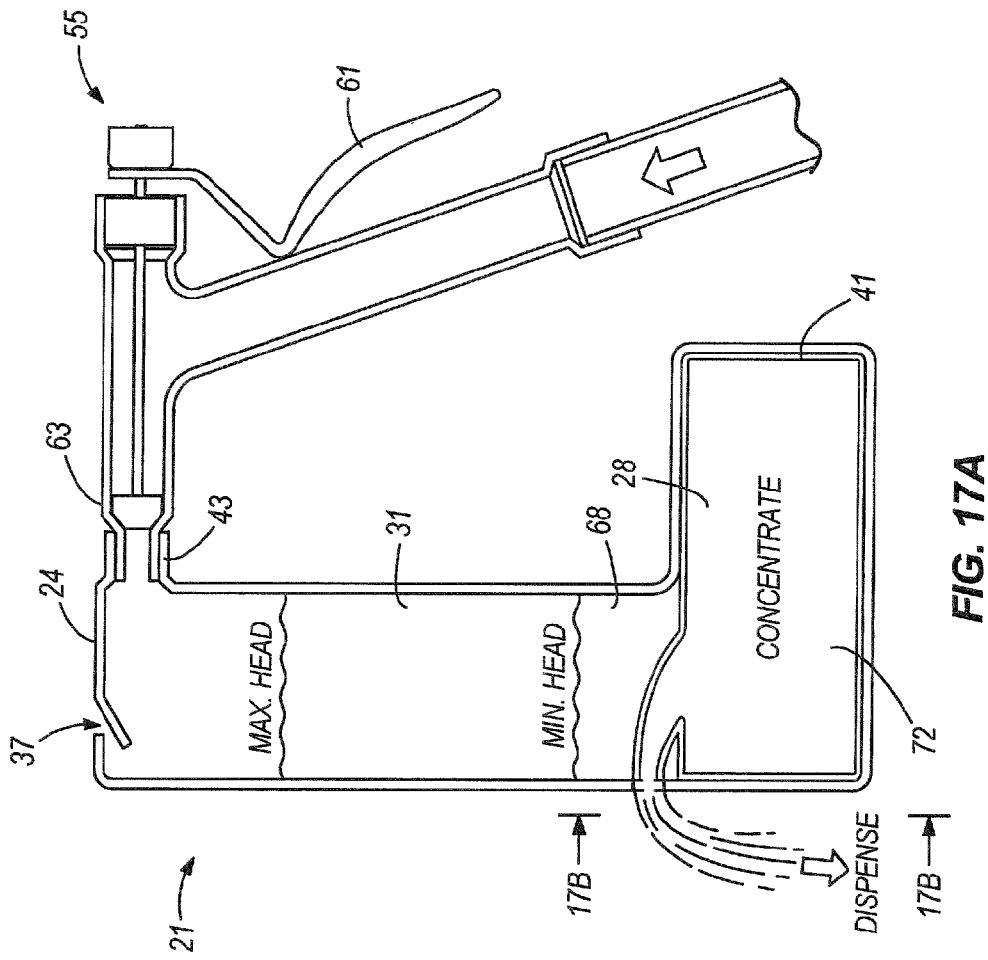
FIG. 17A is a side view of a dilution control device according to an embodiment of the present invention.

A dilution control device 21 according to an embodiment of the present invention is illustrated in FIG. 17A. The illustrated dilution control device 21 includes a rigid or semi-rigid container 24. Although the container 24 can have any shape desired, the container 24 in FIG. 17A is shaped with a reservoir 28 and a head chamber 31, both of which are shaped to retain an amount of fluid. The container 24 in the illustrated embodiment also includes a vent opening 37 at an upper end of the head chamber 31, although other embodiments need not necessarily have a vent opening 37, or can have a vent opening 37 in other locations of the container 24. The reservoir 28 in the embodiment of FIG. 17A is shaped to retain a pliable container, such as a bag 41. The bag 41 can have any shape capable of being at least partially retained within the reservoir 28, and in some embodiments has a shape corresponding to or adaptable to that of the reservoir 28. The container 24 illustrated in FIG. 17A also includes a fluid inlet 43 and a number of fluid outlets 48 and 51.

In some embodiments, the fluid outlet 51 is defined by an orifice in an orifice plate 53 permanently or releasably attached to the container 24 in any suitable manner. For example, the orifice plate 53 can be permanently attached to the container 24 by ultrasonic welding, hot melting, overmolding, adhesive or cohesive bonding material, and the like. Alternatively, the orifice plate 53 can be releasably attached to the container 24 by one or more screws, pins, clips, clamps, or other conventional fasteners, one or more inter-engaging elements on the orifice plate 53 and container 24, and the like.

The fluid inlet 43 receives a diluent fluid from a diluent fluid conduit or flow-controlling device, such as the illustrated dispenser 55. The illustrated dispenser 55 includes an actuator 61 for actuating a flow-controlling valve 63 of the dispenser 55. In some embodiments, the actuator 61 and the valve 63 are spring-biased to closed "no-flow" positions. Although the container 24 is illustrated in FIG. 17A as being connected to a manually-actuatable dispenser 55 having a lever-type actuator 61, it should be noted that the container 24 can instead by connected to any other manual or automatic control for operation of the valve 63. For example, in other embodiments, the valve 63 can be opened, closed, or otherwise adjusted by one or more knobs, buttons, slides, twistable grips, or other manual valve controls, all of which are well-known to those skilled in the art. As another example, the valve 63 can instead by opened, closed, or otherwise adjusted by one or more solenoids, piezo-actuated drives, magnets or magnet sets, ball and screw actuators, and the like, all of which are well-known to those skilled in the art.

Although the device 21 illustrated in FIG. 17A has only one fluid inlet 43 connected to the container 24 near a top of the container 24, the device 21 can have any number of fluid inlets 43 located anywhere on the container 24. In those embodiments having two or more fluid inlets 43, each of the fluid inlets 43 can be provided with a corresponding valve 63 that can be powered or operated manually. For example, the container 24 can be provided with different diluents through two or more different dispensers 55. Any one or more of the dispensers 55 can be opened or closed alone or at the same time as one or more other dispensers 55 in order to generate different types of concentrate and diluent mixtures. As another example, the container 24 can be connected to the same type of diluent through different dispensers 55, such as for diluents introduced into the container 24 from different dispensers 55 at different respective temperatures.

The bag 41 within the reservoir 28 can contain a fluid to be diluted (such as a detergent, bleach, ammonia, or other cleaning fluid, soda syrup, fruit concentrate, or other comestible fluid, and the like), herein referred to as a "concentrate". In this regard, the term "concentrate" does not indicate or imply the degree to which the subject fluid is concentrated, and instead only means that the fluid is at a higher concentration than that which is produced by mixture with the diluent fluid. The bag 41 illustrated in FIG. 17A includes a concentrate outlet 67 in communication with the fluid outlet 51 of the container 24. The remaining fluid outlets 48 of the container 24 allow flow of the diluent fluid out of the container 24.

When the diluent fluid is dispensed into the container 24, it at least partially fills the head chamber 31 of the container 24, and can partially or fully fill that portion of the reservoir 28 not occupied by the bag 41. As diluent fluid accumulates in the container 24, a pressure head develops under the principles of hydrostatic pressure. As the pressure head increases and the diluent fluid level surpasses the height of the fluid outlets 48, diluent fluid empties from the container 24 at a rate proportional to the pressure head. The pressure head also acts upon the concentrate within the bag 41, and causes the concentrate to be dispensed from the bag 41 (and therefore, from the fluid outlet 51) at a rate proportional to the pressure head. Therefore, because both the dispense rate of the diluent fluid and the dispense rate of the concentrate are dependent upon the pressure head, there exists a proportional relationship between the dispense rate of the diluent fluid and that of the concentrate. This proportional relationship can exist through a range of diluent and concentrate flow rates and through a range of volumes occupied by the diluent fluid in the head chamber 31.

If the rate of diluent fluid dispensed into the container 24 exceeds the rate of diluent fluid drainage from the container 24, the pressure head continues to increase as the level of diluent fluid reaches higher and higher into the head chamber 31. As the pressure head increases, it causes a proportional increase in the dispense rate of the concentrate from the bag 41 out the fluid outlet 51, and also a proportional increase in the dispense rate of the diluent fluid out of the container 24 through the openings 48. In some embodiments, the container 24 is rigid or semi-rigid to avoid deformation or stretching under internal fluid pressure. In other embodiments, it may not be necessary for the container 24 to maintain a given rigid form, and some degree of stretching, deforming, or sagging of the container 24 can be acceptable.

Figure 17B:
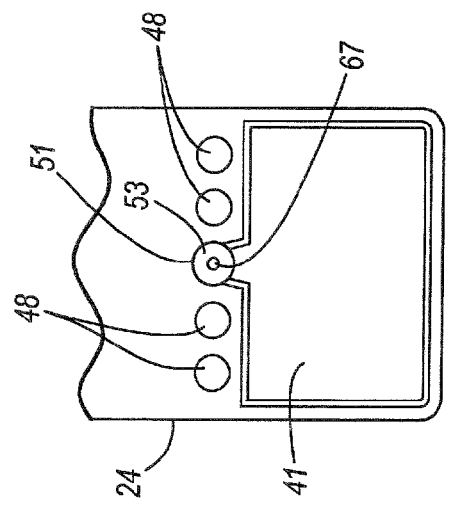
FIG. 17B is a partial front view of the dilution control device shown in FIG. 17A.

FIG. 17B illustrates an example of a configuration for the fluid outlets 48 and 51 described above. In the illustrated embodiment, the fluid outlet 51 for the concentrate is circular, is located centrally along the width of the container 24, and is flanked by two larger circular diluent fluid outlets 48 on each side. The dilution ratio of the concentrate in the diluent fluid is determined at least in part by the position, size, and number of the fluid outlets 48 and 51. An outlet nearer the bottom of the container 24 experiences a higher fluid flow rate due to increased fluid pressure (at a given diluent fluid level) than one nearer the top of the container 24. Likewise, an outlet with a larger cross-sectional area or a plurality of outlets with a collectively larger cross-sectional area allows increased fluid flow. It will be appreciated that any number of combinations of fluid outlet size, shape, and relative position are possible, many of which result in different dilution ratios in operation of the device 21. In this regard, the device 21 can have any number and size of diluent fluid outlets 48 and concentrate fluid outlets 51 in any location or combinations of locations for generating a desired diluent ratio.

Although the fluid outlets 48, 51 illustrated in FIG. 17B are all circular, any one or more of the fluid outlets 48, 51 can have different shapes. The selection of different fluid outlet shapes (e.g., outlets 48, 51 that are horizontally or vertically elongated, outlets 48, 51 having triangular or other polygonal shapes, outlets 48, 51 having irregular shapes, and the like). It is contemplated that the dilution control device 21 is capable of operating at different dilution ratios by varying at least one characteristic (e.g., the size, shape, number, or location) of one or more concentrate fluid outlets 51 and/or diluent fluid outlets 48. In some embodiments, the dilution ratio of the container 24 can be changed by plugging or opening one or more outlets 48 and 51 and/or by replacing the orifice plate 53 with an orifice plate 53 having one or more outlets 48, 51 with different characteristics.

The reservoir 28 of the container 24 in the illustrated embodiment is generally rectangular, and extends laterally beyond at least one side wall of the head chamber 31. This container shape keeps the bag 41 in a predetermined position within the container 24. The position of the bag 41 within the container 24 affects the level of pressure acting on the concentrate within the bag 41 (and thus, the fluid pressure of the concentrate and the dispense rate thereof). In some embodiments, it is desirable to keep the bag 41 adjacent a bottom surface 72 of the container 24. Also, in some cases, the density of the concentrate may be sufficiently greater than the density of the diluent fluid such that the bag 41 remains at the bottom of the container 24 by gravity. In some embodiments, the bag 41 is located above a bottom surface 72 of the container 24, in which case concentrate can still be dispensed from the bag 41 at a desired ratio with respect to diluent based upon the same principles described above. If the bag 41 is at a location spaced from a bottom surface 72 of the container 24, any suitable method of retaining the bag 41 in a fixed vertical position relative to the container 24 can be employed (e.g., container shape, one or more fasteners securing the bag 41 with respect to the container 24, and the like).

FIGS. 18A and 18B illustrate a dilution control device 76 according to another embodiment of the present invention. The dilution control device 76 is similar to the dilution control device 21 shown in FIGS. 17A and 17B and described above. For the sake of brevity, those characteristics and principles of operation which are substantially similar to those discussed above are not repeated in detail. Likewise, the dilution control device 76 illustrated in FIGS. 18A and 18B can include any of the variations described above in connection with the embodiment of FIGS. 17A and 17B.

The dilution control device 76 illustrated in FIGS. 18A and 18B includes a dispenser 80 for dispensing diluent fluid into a container 84. The dispenser 80 is formed with a cap 88 and a grip 92. In some embodiments, the cap 88 attaches directly to the container 84 by a releasable connection, such as by a threaded connection, a snap or other type of interference fit, a retaining ring, and the like. The cap 88 can be provided with one or more grips 96 for enabling a user to twist or otherwise manipulate the cap 88 for installation and removal. Also, the cap 88 and/or the container 84 can be equipped with one or more vent openings (not shown) to vent the container 84. In some embodiments, a portion 100 of the container 84 comprising the bag 116 and an orifice plate 104 can be pre-assembled and then installed in the container 84 as a unit. The illustrated embodiment of FIGS. 18A and 18B also provides another example of a manner in which the diluent and concentrate outlets 108, 112 can be arranged. In this embodiment, a number of diluent fluid outlets 108 surround a central fluid concentrate outlet 112.

In some embodiments, the containers 24, 84 described above are disposed after one use (i.e., after one bag 41, 116 of concentrate is consumed). In other embodiments, the container 24, 84 can be used repeatedly by inserting a new full bag 41, 116 of concentrate after each prior bag 41, 116 is consumed. A removable or openable orifice plate 53, 100 or other access door or panel of the container 24, 84 can permit a quick switch-out of bags 41, 116 by providing access to the interior of the container 24, 84 without removing the dispenser 55, 80. With reference again to the illustrated embodiment of FIGS. 18A and 18B, a scale or other visual indicia 118 can be located on a wall of the container 84, and can be oriented to allow an operator to monitor either or both of the diluent and concentrate fluid levels within the container 84.

Figure 19:
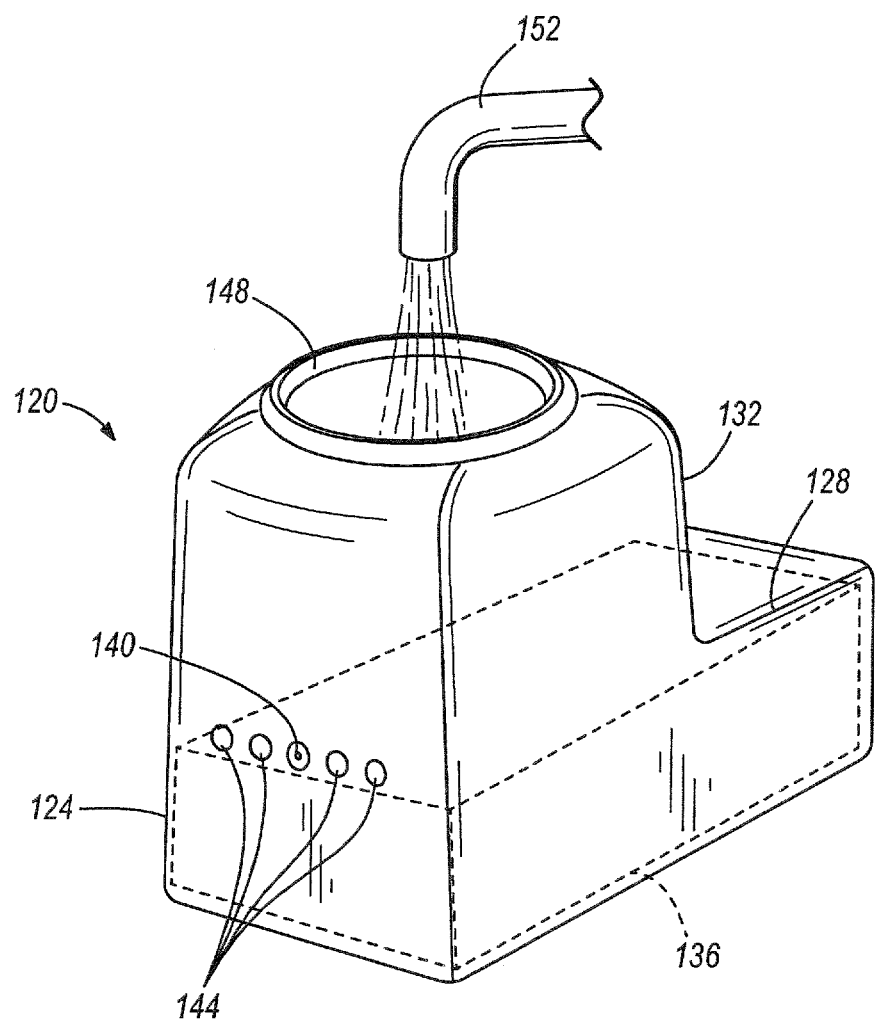
FIG. 19 is a perspective view of a dilution control device according to another embodiment of the present invention.

FIG. 19 illustrates a dilution control device 120 according to another embodiment of the present invention. The dilution control device 120 illustrated in FIG. 19 is similar to the dilution control devices 21, 76 shown in FIGS. 17A-18B and described above. For the sake of brevity, those characteristics and principles of operation which are substantially similar to those discussed above are not repeated in detail. Likewise, the dilution control device 120 illustrated in FIG. 19 can include any of the variations described above in connection with the embodiments of FIGS. 17A-18B.

The dilution control device 120 illustrated in FIG. 19 includes a container 124 with a reservoir 128 and a head chamber 132. The reservoir 128 retains a bag 136, which in turn holds concentrate to be dispensed in a predetermined ratio with a diluent fluid. The concentrate in the bag 136 is dispensed via a fluid outlet 140 of the container 124. Additional fluid outlets 144 are provided in the container 124 for dispensing the diluent fluid. The container 124 includes an opening 148 at an upper portion thereof. The opening 148 serves as an entry location for receiving the diluent fluid into the container 124. The opening 148 also serves as a vent opening, allowing air to escape from the container 124 as it is filled with the diluent fluid. The container 124 is well-suited for receiving diluent fluid from a stationary fixture, such as a faucet 152. In some embodiments, the container 124 is shaped to be connected to or otherwise supported upon a sink, container, shelf, bracket, or other structure adjacent the location to which the diluent and concentrate is dispensed. For example, the container 124 can have a lip or flange (not shown) enabling the container to be hung from an edge of a sink, bucket, or other container. The container 124 can have any other shape and/or be provided with any device suitable for connecting or otherwise supporting the container 124 as described above.

FIGS. 20A-21B illustrate a dilution control device 156 according to another embodiment of the present invention.

The dilution control device 156 illustrated in FIGS. 20A-21B includes a container 160 having a pair of chambers 164 and 168 separated by a partition wall 172. The chambers 164, 168 illustrated in FIGS. 20A-21B are substantially the same in size and shape, although the chambers 164, 168 can have different sizes and/or shapes in other embodiments.

The container 160 has a fluid outlet 176 located below the chambers 164 and 168. In other embodiments, the fluid outlet 176 is located in different positions with respect to the chambers 164, 168, such as laterally to either side of the chambers 164, 168.

A first fluid passage 180 includes a first end 180*a* in communication with the first chamber 164 and a second end 180*b* for delivering fluid toward the fluid outlet 176. A second fluid passage 184 includes a first end 184*a* in communication with the second chamber 168 and a second end 184*b* for delivering fluid toward the fluid outlet 176.

Figure 20A:
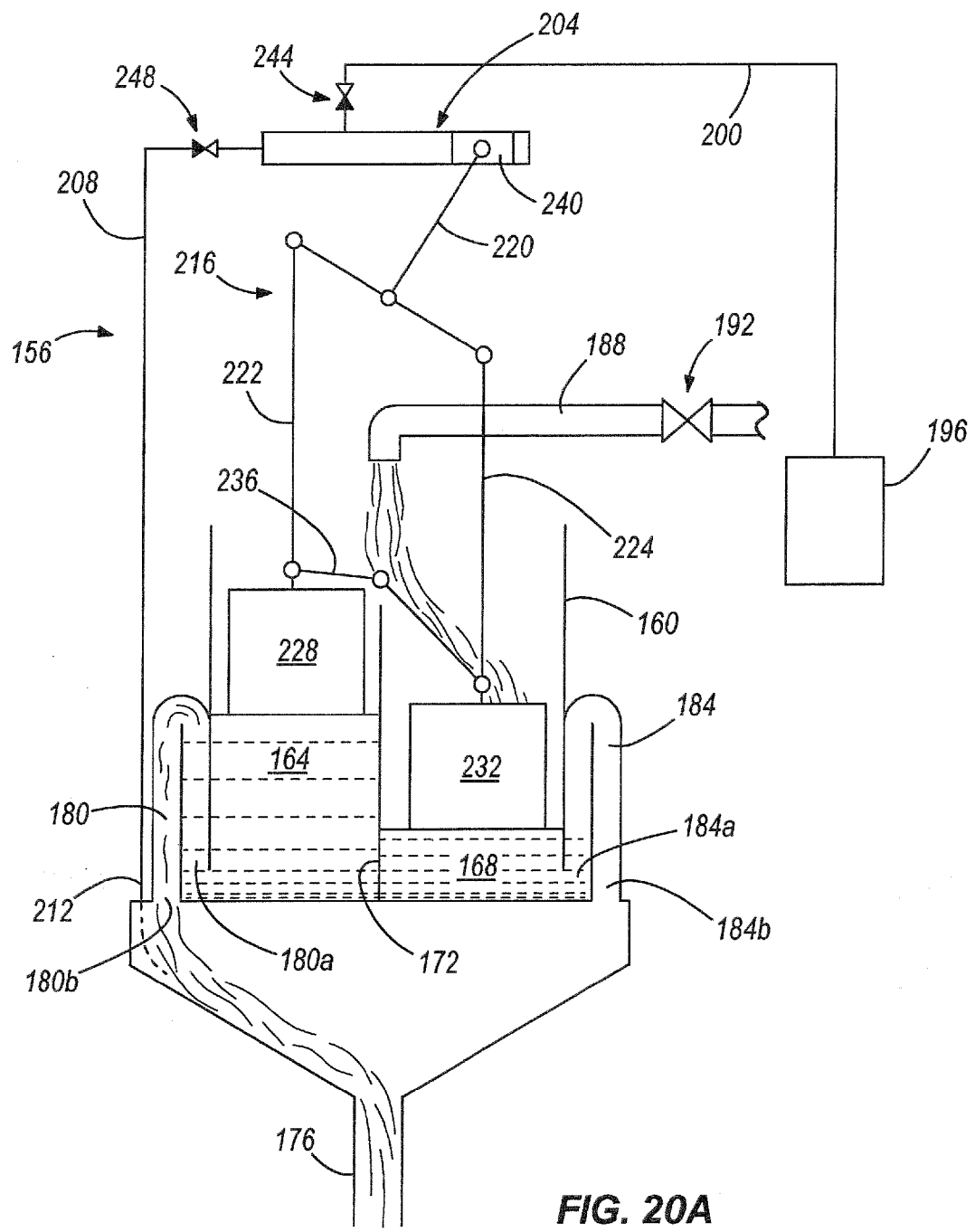
FIG. 20A is a schematic view of a dilution control device according to another embodiment of the present invention, shown in a first state of operation.
Figure 20B:
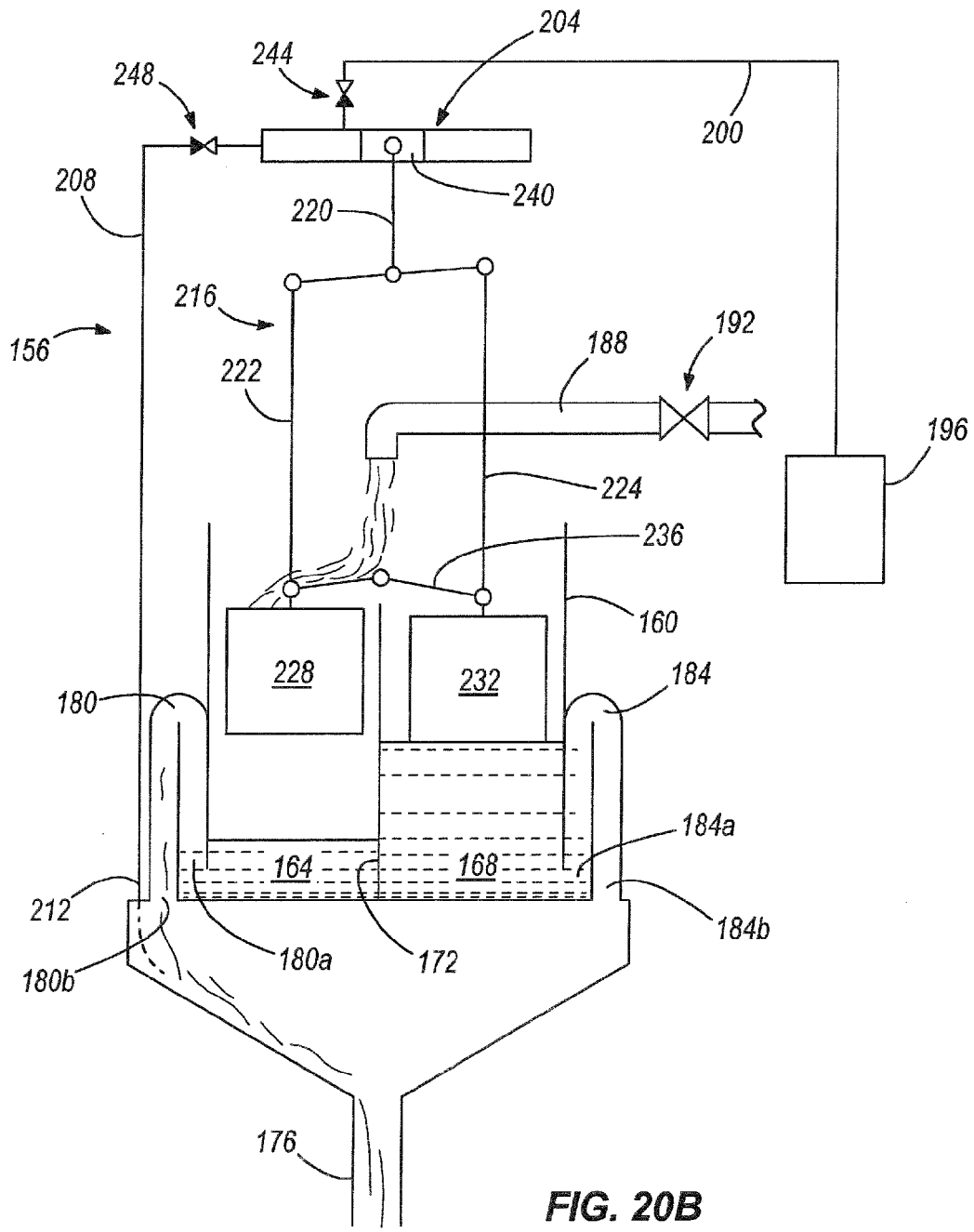
FIG. 20B is a schematic view of the dilution control device illustrated in FIG. 20A, shown in a second state of operation.
Figure 21A:
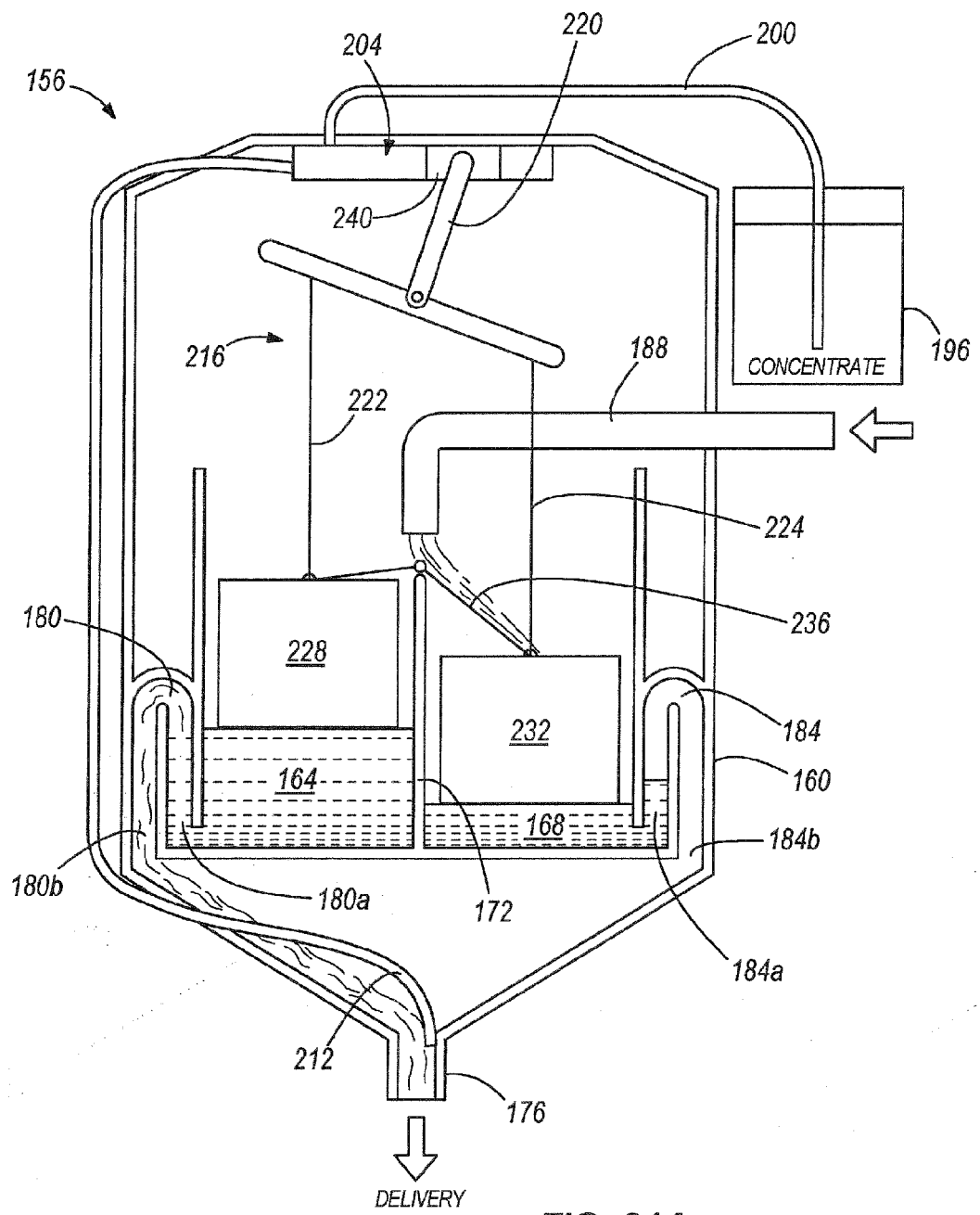
FIG. 21A is an alternative view of the dilution control device illustrated in FIGS. 20A and 20B, shown in the first state of operation.
Figure 21B:
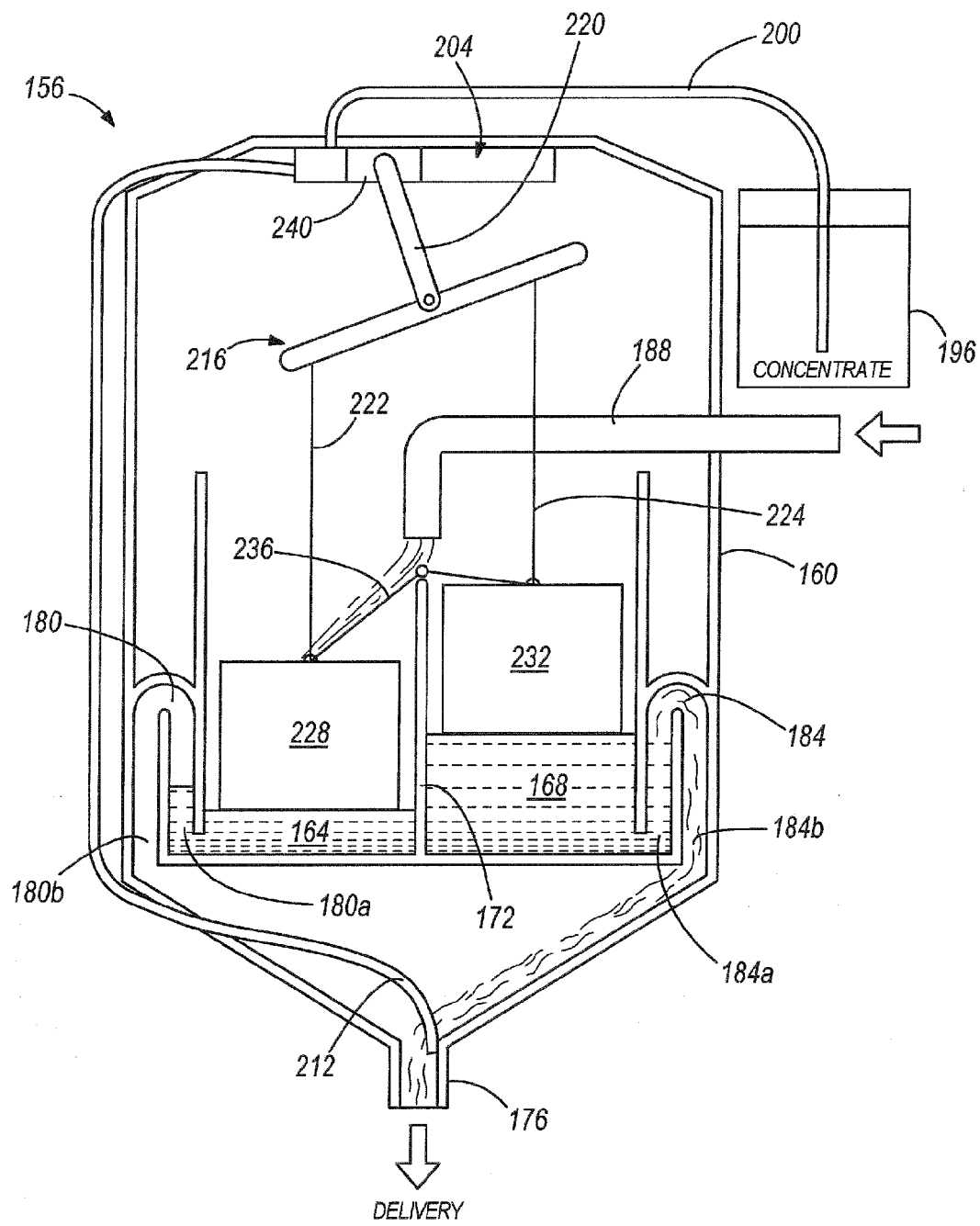
FIG. 21B is another alternative view of the dilution control device illustrated in FIGS. 20A and 20B, shown in the second state of operation.

Diluent fluid is supplied via a conduit 188 to the interior of the container 160. As illustrated in FIGS. 20A and 20B, a valve 192 can be used in some embodiments to control the flow of diluent fluid into the container 160. In addition, a volume of concentrate is held in a container 196. The concentrate container 196 is located within, adjacent to, or remotely from the container 160. In the illustrated embodiment of FIGS. 20A-21B, a concentrate supply line 200 fluidly connects the concentrate container 196 and a pump 204. A second concentrate supply line 208 fluidly connects the pump 204 and a concentrate fluid outlet 212. FIGS. 20A and 20B illustrate one suitable location for the concentrate fluid outlet 212, whereas FIGS. 21A and 21B illustrate an alternative location for the concentrate fluid outlet 212. The concentrate fluid outlet 212 can be in any other location suitable for delivery of concentrate pumped by the pump 204 (as described below) toward a flow of diluent through the device 156. Diluent fluid and concentrate are commingled within the container 160 or alternately, are dispensed separately from the containers 160 and 196 for mixture downstream of the device 156. In some embodiments, it is an object to merely control the relative volumes or flow rates of diluent fluid and concentrate delivered by the device 156. The diluent fluid and concentrate are collected separately, and can be dispensed into a single container such as a sink, bucket, tub, machine reservoir, or other container. In some embodiments, it is an object to mix the diluent fluid and concentrate together either prior to dispensing ("premix") or after dispensing ("post-mix"). Provisions for mixing, stirring, agitating or processing the diluent and concentrate fluids together in any other manner are either incorporated into the dilution control device 156 or are utilized separately.

The dilution control device 156 illustrated in FIGS. 20A-21B also includes a rocker 216 reciprocable to different positions for directing diluent to different chambers 164, 168 of the container 160. The rocker 216 can be located partially or entirely in the container 160, or can be located outside of the container 160 and upstream of either or both chambers 164, 168. The rocker device 216 illustrated in FIGS. 20A-21B includes at least a first link 222, and a second link 224, both of which are drivably connected to the pump 204 as will be described in greater detail below. The first link 222 is coupled to or is positioned to be moved by a first float 228 when the first float 228 rises based upon a rising diluent level in the first chamber 164, whereas the second link 224 is coupled to or is positioned to be movable by a second float 232 when the second float 232 rises based upon a rising diluent level in the second chamber 168. This motion of the first and second links 222, 224 can be transferred to the pump 204 in a number of different manners. For example, the first and second links 222, 224 in the illustrated embodiment of FIGS. 20A-21B are drivably coupled to a common third link 220 which is drivably connected to the pump 204. When the first and second links 222, 224 move upward and downward, this motion causes the third link 220 to pivot, thereby imparting motive force to the pump 204 by virtue of its connection thereto.

With continued reference to the embodiment of FIGS. 20A-21B, a baffle 236 is coupled to the first and second links 222, 224. The baffle 236 has a surface across which diluent flows toward the first chamber 164 in at least one position of the baffle 236, and a surface across which diluent flows toward the second chamber 168 in at least one other position of the baffle 236. In some embodiments (see FIGS. 20A-21B), the baffle 236 has two surfaces which are angled with respect to one another. In some embodiments, the baffle 236 is shaped as a wide, upside-down "V" (i.e., having an obtuse angle generally facing the chambers 164, 168) having surfaces of equal or unequal length. The baffle 236 is configured to direct diluent fluid from the supply conduit 188 into one of the first chamber 164 and the second chamber 168. In other embodiments, the baffle 236 can have surfaces at different angles with respect to one another while still directing diluent fluid as described above. Acceptable deflector shapes capable of performing this function can be determined at least in part by the shape, size, and/or relative position of the chambers 164, 168, and the position of the baffle 236 with respect thereto.

In operation, as diluent fluid is supplied to the container 160 and onto the baffle 236, the rocker 216 rocks side to side (as viewed in FIGS. 20A-21B) to actuate the pump 204 and to dispense concentrate at a rate proportional to the dispense rate of the diluent fluid. The first and second floats 228 and 232 are configured to drive the rocking action of the rocker 216. The rocker device 216 illustrated in FIGS. 20A and 21A is in a first position (the first float 228 being higher than the second float 232) because the second chamber 168 contains less diluent fluid than the first chamber 164. Due to the orientation of the baffle 236 when the rocker device 216 is in the first position, diluent fluid from the supply conduit 188 is directed to the second chamber 168. As the diluent fluid level in the second chamber 168 rises, the second float 232 also rises. The buoyant force on the second float 232 drives the rocker device 216 toward a second position (shown in FIG. 21B) in which the first float 228 is positioned lower than the second float 232. In effect, the rising diluent fluid level in the second chamber 168 drives the first float 228 downward into the first chamber 164, thereby pushing diluent from the first chamber 164 through the first fluid passage 180 toward the fluid outlet 176.

When the second float 232 rises sufficiently, the baffle 236 is positioned such that diluent fluid is no longer directed into the second chamber 168, but rather, is directed into the first chamber 164. The first chamber 164 is re-filled with diluent fluid, and the rocking motion is reversed. In this manner, the buoyant force on the first float 228 causes a downward motion of the second float 232, which drains the diluent fluid from the second chamber 168. As diluent fluid continues to flow into the container 160, the rocking motion continues, driving the first link 220 back and forth. The first link 220 is coupled to the pump 204, which can be driven by the reciprocation of the first link 220 (e.g., via a piston within the pump 204). The back and forth motion of the piston 240 draws concentrate from the container 196 and delivers the same toward the fluid outlet 176 or another desired location. In some embodiments, first and/or second check valves 244 and 248 can be included to prevent backflow of concentrate from the pump 204 toward the container 196, and from the concentrate fluid outlet 212 toward the pump 204. The pumping rate, and therefore the dispense rate of concentrate, increases with increased diluent fluid flow rate, and decreases with decreased diluent fluid flow rate. The rocker 216 and pump 204 therefore automatically provide concentrate at a predetermined dilution ratio when diluent fluid is dispensed into the container 160. The predetermined dilution ratio is also maintained while the dispense rate of diluent fluid is varied. In a batch-type operation, a volume of diluent fluid is dispensed into the container 160, and a corresponding volume of concentrate (according to the predetermined dilution ratio) is dispensed by the dilution control device 156.

The predetermined dilution ratio of concentrate to diluent is variable, and can be changed in various ways. In some embodiments, the sizes of the concentrate supply lines 200 and 208 can be changed to adjust this dilution ratio. In these and other embodiments, the pump 204 can be replaced with a differently sized or differently performing pump. Also, in some embodiments, the stroke of the pump 204 can be limited by any device internal or external to the pump 204 (in any manner well-known to those in the art of pumps and pumping equipment). The rocker 216 can also be modified or replaced to provide a different motion path for the baffle 236 and the third link 220, thereby changing the force and/or actuation movement provided by the third link 220. In some embodiments, the first float 228 and the second float 232 can be modified in shape, size, material, and/or weight to change their buoyant characteristics, thereby changing the speed and/or force exerted by the rocker 216 upon the pump 204. In these and other embodiments, the capacities of the first chamber 164 and/or the second chamber 168 can be changed to affect the speed and force of the rocker 216. Furthermore, in some embodiments, the shape and/or size of the first and second passages 180, 184 can be changed to affect the rate of flow through the passages. Also, in some embodiments, multiple pumps 204 can be driven by the same rocker device 216. Those of ordinary skill in the art will appreciate that additional modifications and variations of the rocker 216, floats 228, 232, container 196, pump 204, passages 180, 184, supply lines 200, 208, conduit 188, and/or valves 244, 248 are possible for modifying the dilution ratio of fluid generated by the dilution control device 156, all of which fall within the spirit and scope of the present invention.

As an alternative to the rocker 216 as shown and described, in some embodiments a single float and chamber are used with a biased return (either internal or external to the pump 204) from a biasing element, such as a spring, elastic band, or the like.

In alternative embodiments, motion of either or both of the first and second links 222, 224 (as described above) can operate the pump 204 by direct connection of either or both links 222, 224 thereto. Alternatively, the pump 204 can be driven by motion of the baffle 236, such as by rotational motion of a pivot about which the baffle 236 rotates. In those embodiments in which the pump 204 is driven by motion of the baffle 236, the links 222, 224 need not necessarily be used. Still other manners of directly or indirectly transferring motion of the baffle 236 to actuation of the pump 204 are possible, and fall within the spirit and scope of the present invention.

Figure 22A:
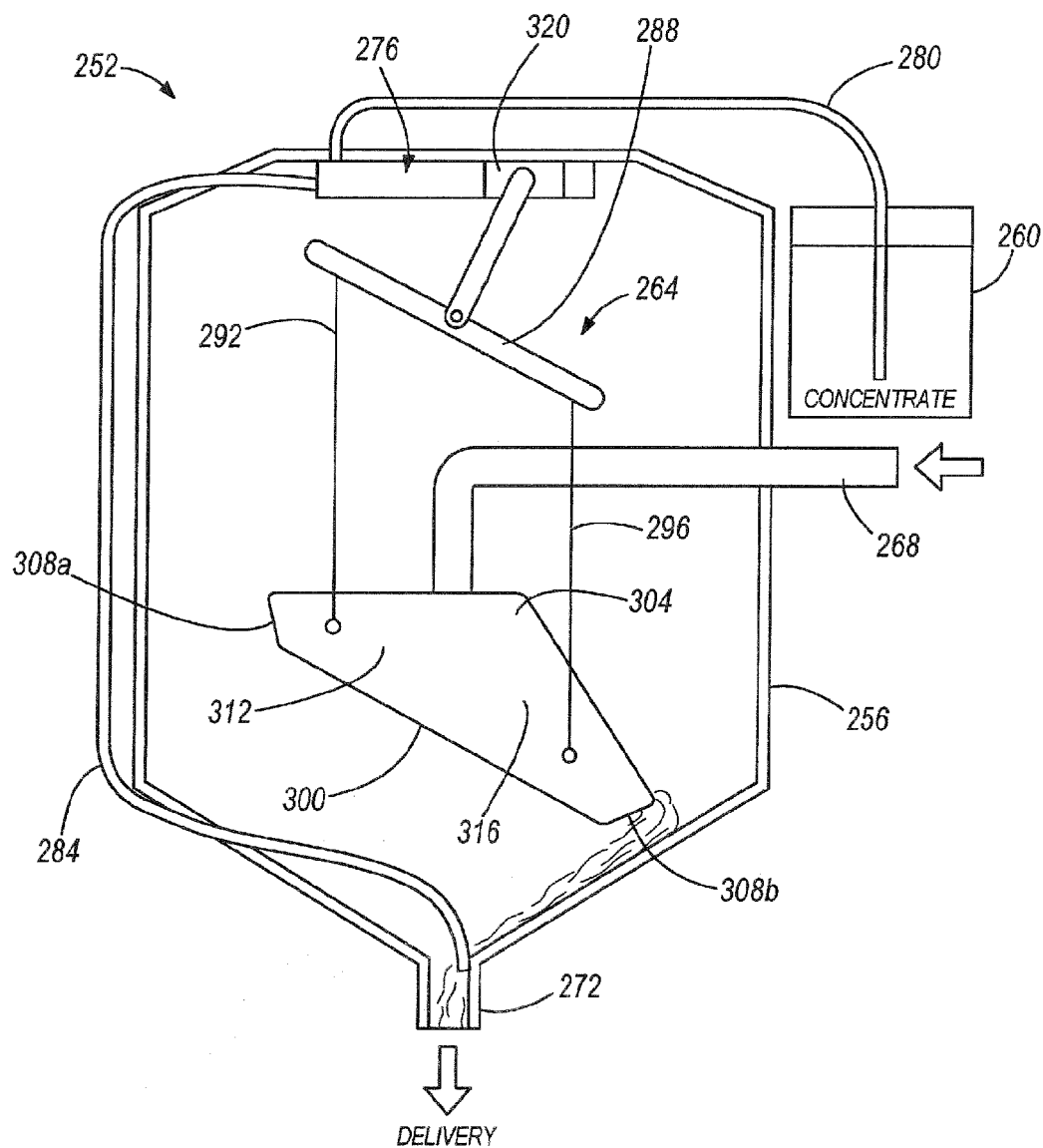
FIG. 22A is a schematic view of a dilution control device according to another embodiment of the present invention, shown in a first state of operation.
Figure 22B:
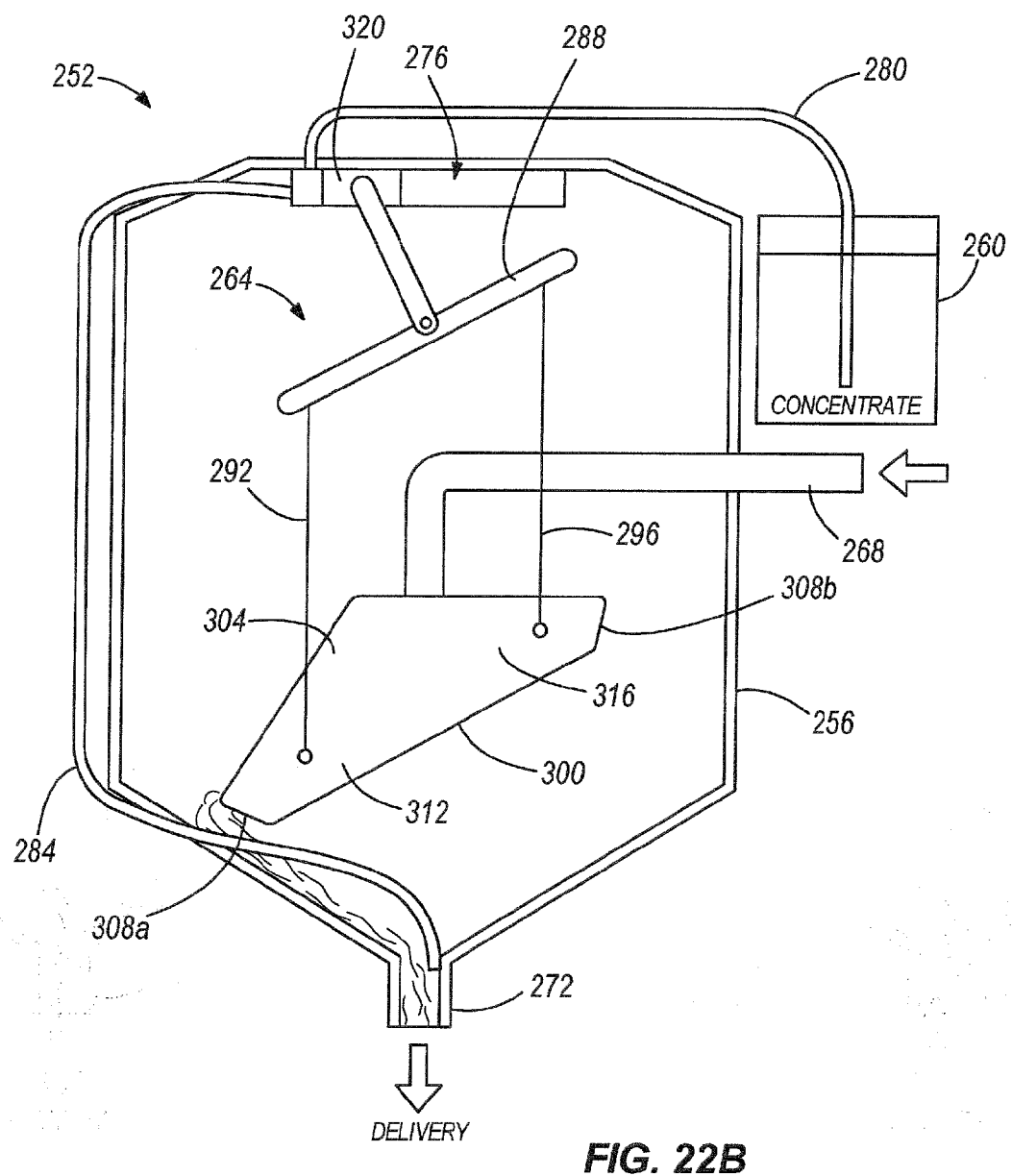
FIG. 22B is a schematic view of the dilution control device illustrated in FIG. 22A, shown in a second state of operation.

A dilution control device 252 according to another embodiment of the present invention is illustrated in FIGS. 22A and 22B. The dilution control device 120 illustrated in FIGS. 22A and 22B is similar in many respects to the dilution control devices 21, 76 shown in FIGS. 20A-21B and described above. For the sake of brevity, those characteristics and principles of operation which are substantially similar to those discussed above are not repeated in detail. The following description of the dilution control device 252 is focused mainly upon the differences from the above-described devices. Also, it should be noted that the dilution control device 252 illustrated in FIGS. 22A and 22B can include any of the variations described above in connection with the embodiments of FIGS. 20A-21B.

The dilution control device 252 illustrated in FIGS. 22A and 22B includes a main container 256, a concentrate container 260, and a rocker 264. Diluent fluid is supplied to the container 256 via a conduit 268, and is subsequently delivered to a fluid outlet 272 of the container 256. A pump 276 pumps concentrate from the concentrate container 260 to the fluid outlet 272 along first and second concentrate supply lines 280 and 284.

The rocker 264 illustrated in FIGS. 22A and 22B includes first and second links 292, 296, both of which are drivably connected to the pump 276 as will be described in greater detail below, and are also connected to a baffle, illustrated in FIGS. 22A and 22B as a receptacle 300. The receptacle 300 has at least two different chambers 312, 316 within which diluent can be received. In the illustrated embodiment, for example, the receptacle 300 includes a partition wall 304 and peripheral walls 308a and 308b defining a first chamber 312 and a second chamber 316. Referring to FIG. 22A, the diluent fluid enters the first chamber 312 as diluent fluid from the second chamber 316 is emptied toward the fluid outlet 272. As diluent fluid fills the first chamber 312 and evacuates the second chamber 316, the movable receptacle 300 begins to tip toward the position shown in FIG. 22B due to the shifting of mass within the movable receptacle 300. As the rocker 264 reaches the position shown in FIG. 22B, the chambers 312, 316 are re-positioned such that diluent from the conduit 268 enters the second chamber 316. As a result of this movement of the receptacle 300, the diluent fluid previously dispensed into the first chamber 312 is dumped toward the fluid outlet 272. This rocking cycle repeats as long as diluent fluid is supplied from the conduit 268.

As the receptacle 300 rocks back and forth, the first link 292 and the second link 296 drive a reciprocating element, such as a piston 320, back and forth in the pump 276. This motion can be transferred in a number of different manners. By way of example only, the first and second links 292, 296 are connected to the pump 276 by a common third link 288. The third link 288 is coupled to the pump 276, and moves to actuate the pump 276 as the first and second links 292, 296 move (as described above). In other embodiments, the pump 276 can be driven by direction connection with either or both of the first and second links 292, 296, by a pivot about which the receptacle 300 rotates, or in any other manner in which motive force is transferred from the receptacle 300 to the pump 276.

In some embodiments, one or more check valves are used on the first and/or second concentrate supply lines 280, 284 to assist in preventing backflow. Also, as an alternative to a multi-chamber receptacle 300, a single-chamber receptacle 300 can be used. In such embodiments, the single-chamber receptacle can be positioned to fill with diluent fluid, tip by gravity to dump diluent fluid collected therein, and return to an original position under force of a biasing element such as a spring, elastic band, and the like.

The receptacle 300 in the illustrated embodiment is pivotable to different positions in order to discharge diluent collected therein. However, it should be noted that the receptacle 300 can instead move in other manners enabling diluent discharge.

Figure 23:
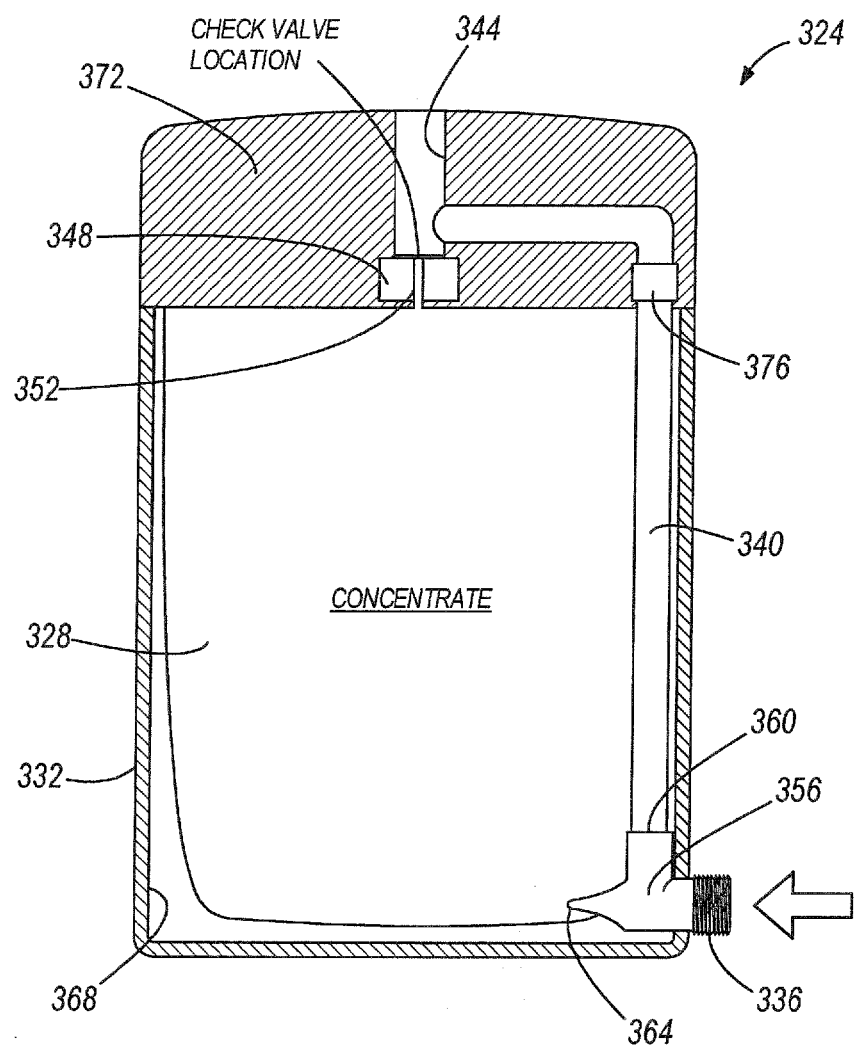
FIG. 23 is a cross-sectional elevational view of a dilution control device according to another embodiment of the present invention.

A dilution control device 324 according to another embodiment of the present invention is illustrated in FIG. 23. The illustrated dilution control device 324 includes a pliable concentrate package (e.g., a bag 328) positioned within a rigid or semi-rigid container 332. The dilution control device 324 also has a diluent fluid inlet 336 connectable to a diluent fluid source, and a diluent fluid passage 340 fluidly coupling the diluent fluid inlet 336 and a fluid outlet 344 of the dilution control device 324. The concentrate bag 328 in the illustrated embodiment is fluidly coupled to the fluid outlet 344 by a fitting 348 having a flow controlling orifice 352.

The dilution control device 324 in the illustrated embodiment of FIG. 23 also has a flow divider 356 through which diluent is passed to different portions of the dilution control device 324. The illustrated flow divider 356 has first and second outlets 360 and 364 for directing incoming diluent fluid to the diluent fluid passage 340 and to an interior chamber 368 of the container 332 (i.e., between the concentrate bag 328 and the walls of the container 332), respectively. The diluent fluid inlet 336, flow divider 356, fluid passage 340, and fluid outlet 344 can be located in a large number of other positions with respect to the container 332 and each other while still providing the same flow of diluent (as described above) to the interior chamber 368 and toward the fluid outlet 344. Accordingly, the container 332, interior chamber 368, and concentrate bag 328 can have a number of different shapes and sizes while still falling within the spirit and scope of the present invention.

In some embodiments, the flow divider 356 provides a majority of the incoming diluent fluid to the diluent fluid passage 340, and the remaining minority of diluent fluid to the interior chamber 368. As diluent fluid is supplied to the dilution control device 324, it is split between the first and second outlets 360 and 364 of the flow divider 356. The diluent fluid directed through the first outlet 360 of the flow divider 356 is passed through the diluent fluid passage 340 and the fluid outlet 344 to a desired delivery or collection location. The diluent fluid directed through the second outlet 364 of the flow divider 356 at least partially fills the interior chamber 368, and compresses the contents of the concentrate bag 328. Pressure from the diluent fluid squeezes concentrate through the orifice 352, toward the fluid outlet 344. In the illustrated embodiment, the concentrate and the diluent fluid from the diluent fluid passage 340 join proximate the fluid outlet 344, and are delivered to a desired location together. In other embodiments, concentrate exiting the orifice 352 is delivered to another location for mixture with diluent downstream of the fluid outlet 344.

In some embodiments, the fluid outlet 344 and/or the orifice adapter 348 are defined and/or positioned in a cap 372 attached to the container 332. Also, in some embodiments, the cap 372 is removable from the container 332, thereby facilitating access to the interior chamber 368 and/or enabling removal and replacement of the concentrate bag 328. In those embodiments having a removable cap 372, a releasable fitting 376 can be provided in the diluent fluid passage 340 at a location enabling removal of the cap 372.

As diluent fluid is supplied to the dilution control device 324 illustrated in FIG. 23, the volume of diluent fluid in the interior chamber 368 increases while the volume of concentrate within the concentrate bag 328 decreases. In some embodiments, the flow rate of the diluent fluid can be set at a desired level, whereby the dilution control device 324 provides a flow rate of concentrate through the orifice 352 according to a desired dilution ratio. Modulation of the diluent fluid flow rate can cause a proportional change in pressure exerted by diluent upon the concentrate bag 328 and a proportional change in the rate of concentrate fluid flow through the orifice 352, thereby maintaining the dilution ratio at the desired value through a range of diluent flow rates. In some embodiments, a check valve (not shown, but location indicated in FIG. 23) at the orifice 352 prevents diluent fluid at the fluid outlet 344 from flowing into the concentrate bag 328 through the orifice 352.

In some embodiments, the dilution control device 324 can be adapted to permit user control over the amount and/or flow rate of fluid (at a desired dilution ratio) dispensed from the dilution control device 324. In such embodiments, an operator can activate one or more controls to begin, increase, or stop diluent flow through the dilution control device 324. Such controls can be manual or powered, such as by one or more knobs, solenoids, pumps, or other devices controlling one or more valves along the flow path of fluid into or out of the dilution control device 324. These variations are not exclusively applicable to the dilution control device 324 illustrated in FIG. 23, but also to any of the devices according to other embodiments of the present invention described herein.

As a variation or addition to the dilution control device 324 as described above, the dilution control device 324 can be provided with a control by which pressure exerted by diluent upon the bag 328 can be adjusted. Such a control can comprise one or more valves for controlling diluent entering the interior chamber 368 and/or one or more valves for controlling diluent exiting the interior chamber 368 (e.g., through one or more vents or other outlets (not shown) of the interior chamber 368).

Figure 24B:
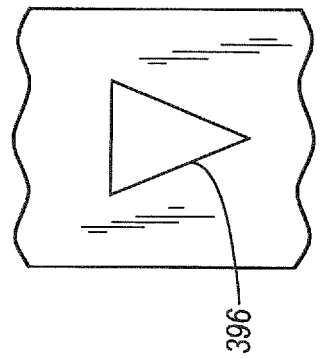
FIG. 24B is a detail view of the dilution control device shown in FIG. 24A.
Figure 24A:
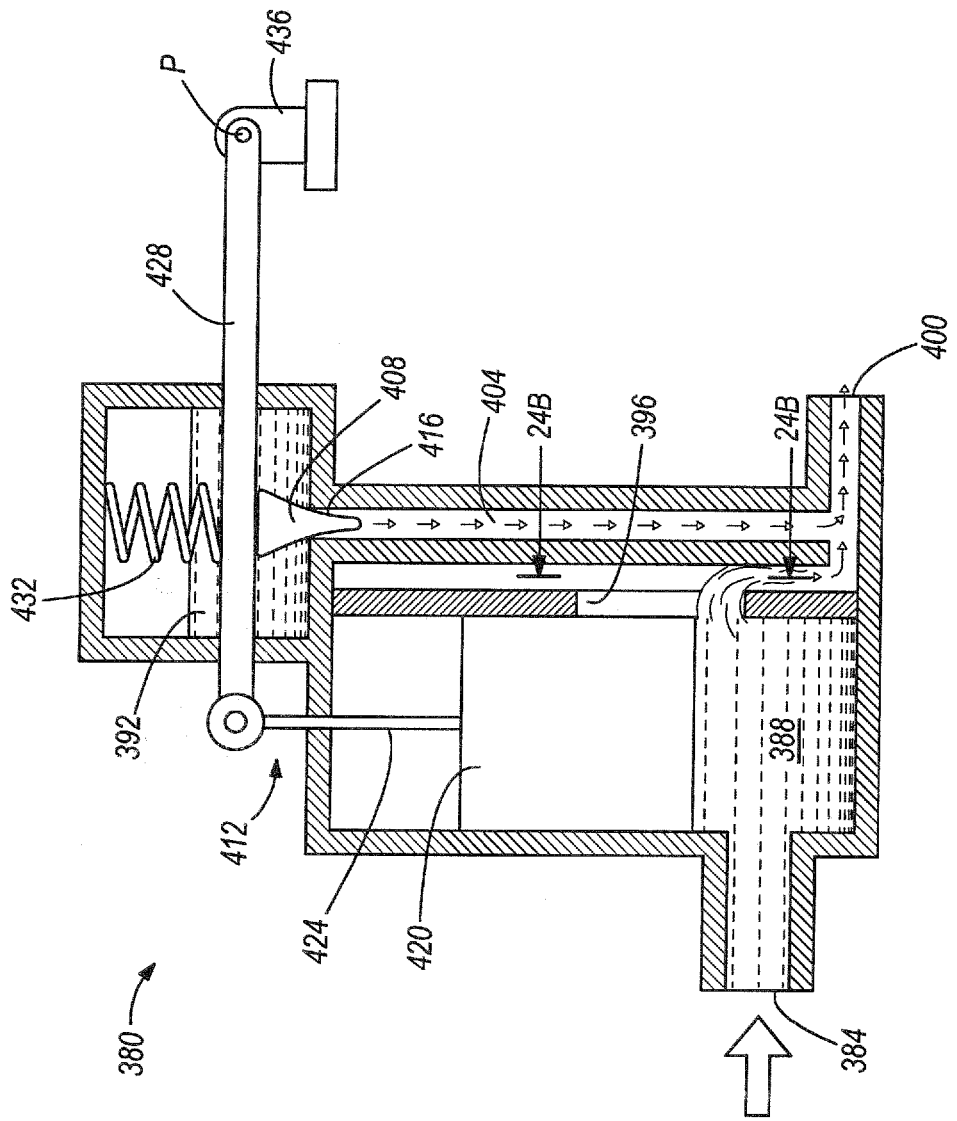
FIG. 24A is an schematic view of a dilution control device according to yet another embodiment of the present invention.

A dilution control device 380 according to another embodiment of the present invention is illustrated in FIGS. 24A and 24B. The illustrated dilution control device 380 includes a diluent fluid inlet 384, a flow-metering chamber 388, and a concentrate container or chamber 392. The flow-metering chamber 388 has a diluent fluid outlet 396 through which diluent flows toward a fluid outlet 400 of the dilution control device 380. In some embodiments, the diluent fluid outlet 396 is a weir opening (shown in detail in FIG. 24B). With continued reference to the embodiment of FIGS. 24A and 24B, the concentrate chamber 392 in the illustrated embodiment is fluidly coupled with the fluid outlet 400 via a concentrate flow passage 404. A valve 408 of a flow-metering mechanism 412 is located at a concentrate outlet 416 of the concentrate chamber 392, or can instead be located anywhere along the concentrate flow passage 404 between the concentrate chamber 392 and the fluid outlet 400. In addition to the valve 408, the flow-metering mechanism 412 in the illustrated embodiment includes a float 420, a float link 424, a valve link 428, and a spring 432. The valve link 428 of the illustrated flow-metering mechanism 412 is pivotable about a pivot point P at a support 436. Also, the valve 408 and the float link 424 of the illustrated embodiment are pivotally coupled to the valve link 428.

As diluent fluid flows into the flow-metering chamber 388, diluent fluid collects in the flow-metering chamber 388, and the level of diluent fluid within the flow-metering chamber 388 rises. In a state of the dilution control device 380 in which there is relatively little or no diluent fluid in the flow-metering chamber 388, the float 420 is in a position (lower than that shown in FIG. 24A) in which the float 420 substantially block the diluent fluid outlet 396. Alternatively, in this position of the float 420, another object coupled to the float 420 can block the diluent fluid outlet 396. As the diluent fluid level in the flow-metering chamber 388 rises, the float 420 is lifted by buoyant force upon the float 420. When the float 420 rises to a level that at least partially opens the diluent fluid outlet 396, diluent fluid passes through the diluent fluid outlet 396 toward the fluid outlet 400 of the dilution control device 380. Also as the float 420 rises, the valve link 428 is driven upward against the downward bias of the spring 432 to create an opening between the valve 408 and the concentrate outlet 416.

In some embodiments, the flow of concentrate toward the fluid outlet 400 allowed by the valve 408 is proportional to the flow of diluent fluid toward the fluid outlet 400 according to a predetermined dilution ratio. Also in some embodiments, as the flow rate of diluent fluid is increased into the flow-metering chamber 388 (and out through the diluent fluid outlet 396), the float element 420 is driven higher, and the valve link 428 further opens the valve 408 against force of the spring 432, thereby allowing a greater flow rate of concentrate from the concentrate container 392. The increase in concentrate flow rate can be proportional to the increase in the diluent fluid flow rate to maintain the predetermined dilution ratio. Accordingly, the flow of diluent fluid and concentrate through the dilution control device 380 can be proportional through a range of diluent fluid flow rates. In particular, the float 420 and the flow-metering mechanism 412 can open and close the diluent fluid outlet 396 and the valve 408 through a range of amounts, permitting proportional diluent and concentrate fluid flow therethrough, respectively.

Those of ordinary skill in the art will appreciate that variations to the flow-metering mechanism 412 can be made in order to achieve dilution control in a similar manner as that described above (i.e., varying the degree of opening of a valve in response to a proportional change in the rate of diluent fluid flow). In some embodiments, the flow-metering mechanism 412 is provided with components such as sensors, actuators, and other devices suitable for electronic, pneumatic, or computer control of the flow-metering mechanism 412. In some embodiments, modifications can be made to the dilution control device 380 to replace the float 420 with one or more sensors or other sensory-control devices that respond to a detected diluent fluid flow rate and that automatically change the flow rate of the concentrate (e.g., by adjustment of a valve 408 of any type) accordingly. Sensory-control devices capable of reacting to the flow rate of diluent can include, for example, a vane or a bladder in fluid communication with diluent entering, moving through, or exiting the dilution control device 380. In such cases, the sensory-control devices can be mechanically and/or electrically coupled to a valve or other mechanism controlling the flow rate of concentrate from the concentrate container 392.

It will be appreciated that a number of different valve types can be utilized in the dilution control device 380 in order to control the flow of diluent from the concentrate container 392 responsive to the rate of diluent flow. By way of example only, the valve 408 can be a needle valve, a ball valve, and the like. Regardless of the type of valve 408 employed, the valve 408 need not necessarily be spring-loaded, such as in cases where the valve 408 is capable of closing itself under the weight of one or more other elements of the flow-metering mechanism and/or float 420. It should also be noted that a number of other types of mechanical connections between the float 420 and the valve 408 are possible for transferring float movement to valve movement 408, all of which fall within the spirit and scope of the present invention.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, a rotary metering device is utilized in some embodiments to control the flow of concentrate through the dispenser. In some embodiments, other non-rotary structures can be used, such as a reciprocating member that selectively blocks a dispensing aperture. In other embodiments, one or more pumps or other metering devices can be utilized. For example, two pumps can be configured or driven to provide different dilution ratios of the same chemical. Alternatively, the additional pumps can be placed in communication with additional chemical reservoirs containing additional chemicals to dispense those chemicals. The additional chemicals can be dispensed simultaneously, sequentially, or alternatively.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

Various features of the invention are set forth in the following claims.

What is claimed is:

1. A chemical dispensing apparatus comprising:
   a housing within which extends a fluid passageway adapted to receive a diluent from a diluent source, the housing defining an area accumulating diluent, the diluent exiting the area under force of gravity;
   a wheel coupled to the housing and in fluid communication with the area, the wheel driven by the gravitational force of diluent flowing from the area;
   a shaft coupled to the housing and the wheel, wherein the shaft is adapted to rotate with the wheel; and
   a pump coupled to the housing and the shaft, wherein the pump is in fluid communication with a reservoir containing a concentrated chemical and wherein the pump is actuated by rotation of the shaft to deliver concentrated chemical to diluent flowing from the area,
   wherein the diluent and the concentrated chemical are dispensed from the housing only by gravitational force, and
   wherein the wheel, the shaft, and the pump are located within and enclosed by the housing, and together with the housing define an integrated and portable unit.

2. The chemical dispensing apparatus of claim 1, further comprising a conduit at least partially positioned in the housing to deliver the concentrated chemical from the pump to diluent passing from the area.

3. The chemical dispensing apparatus of claim 2, wherein the conduit is positioned to deliver the concentrated chemical to the wheel to allow the concentrated chemical to be mixed with the diluent in the wheel.

4. The chemical dispensing apparatus of claim 1, further comprising a set of gears coupled to the housing and positioned to provide power from the shaft to the pump.

5. The chemical dispensing apparatus of claim 4, wherein the set of gears includes a gear ratio that is selected to provide a predetermined dilution ratio.

6. The chemical dispensing apparatus of claim 1, wherein the pump is a positive displacement pump.

7. The chemical dispensing apparatus of claim 6, wherein the positive displacement pump is a gear pump.

8. The chemical dispensing apparatus of claim 1, wherein the pump is dimensioned and configured to deliver a predetermined amount of concentrated chemical to the diluent per each rotation of the wheel.

9. The chemical dispensing apparatus of claim 1, wherein the housing further comprises a funnel along the fluid passageway, upstream from the wheel, and wherein the funnel gathers diluent without connection to a source of diluent and directs the diluent to the wheel.

10. The chemical dispensing apparatus of claim 1, wherein the fluid passageway defines at least a portion of the area from which diluent flows by gravity.

11. The chemical dispensing apparatus of claim 1, wherein a portion of the portable unit engages a portion of a wall of a vessel upon which the portable unit is supported, the portable unit is movable relative to and removable from the portion of the wall of the vessel, and the portable unit is provided between a source of the diluent and the vessel.

12. The chemical dispensing apparatus of claim 1, wherein the conduit delivers the concentrated chemical directly to the wheel prior to introduction of diluent to the wheel.

13. A chemical dispensing apparatus comprising:
a housing within which extends a fluid passageway adapted to receive a diluent from a diluent source;
a concentrated chemical reservoir located within and integral to the housing, at least partially defining a chamber enclosed within the housing, and adapted to retain a quantity of concentrated chemical, wherein the chamber is inaccessible to a user from outside of the housing;
a wheel coupled to the housing and in fluid communication with the fluid passageway, the wheel driven by the impact or weight of diluent flowing through the fluid passageway; and
a shaft coupled to the housing and the wheel and adapted to rotate in response to rotation of the wheel, the shaft positioned within an aperture of the concentrated chemical reservoir and adapted to selectively dispense concentrated chemical from the reservoir via rotation of the shaft,
wherein the housing, the wheel, and the reservoir define a portable unit movable to different positions relative to the diluent source, the portable unit also movable relative to and removable from a wall of a vessel upon which the portable unit is supported.

14. The chemical dispensing apparatus of claim 13, wherein the shaft is a first shaft and the chemical dispensing apparatus further comprises a second shaft and a set of gears, wherein the second shaft is directly coupled to the wheel and adapted to rotate with the wheel, the set of gears are positioned to provide power from the second shaft to the first shaft.

15. The chemical dispensing apparatus of claim 14, wherein the set of gears includes a gear ratio that is selected to provide a predetermined dilution ratio.

16. The chemical dispensing apparatus of claim 13, wherein the shaft includes a rotary metering device in communication with the aperture of the concentrated chemical reservoir, wherein rotation of the shaft causes the rotary metering device to dispense concentrated chemical from the reservoir.

17. The chemical dispensing apparatus of claim 16, wherein the rotary metering device comprises a flatted portion of the shaft in selective communication with the aperture of the concentrated chemical reservoir, rotation of the flattened portion adjacent the aperture provides metered dispensing of a concentrated chemical in the chemical reservoir.

18. The chemical dispensing apparatus of claim 16, wherein the rotary metering device comprises a disc coupled to the shaft and having at least one aperture for receiving concentrated chemical when in communication with the concentrated chemical.

19. The chemical dispensing apparatus of claim 13, wherein the housing further comprises a funnel along the fluid passageway, upstream from the wheel, and wherein the funnel gathers water from a free flowing source of diluent and directs the diluent to the wheel.

20. A method for proportionately mixing a concentrated chemical with a diluent, the method comprising:
delivering a diluent to a fluid passageway extending within a housing;
accumulating diluent in an area defined by the housing, the diluent exiting the area under force of gravity;
rotating a wheel that is coupled to the housing and in fluid communication with the area by the gravitational force of diluent acting on the wheel;
operating a pump coupled to the housing via rotation of the wheel, wherein the pump is in fluid communication with a reservoir containing a concentrated chemical and operation of the pump is proportional to the rotation of the wheel, wherein the wheel and pump are located within and enclosed by the housing, and together with the housing define an integrated and portable unit;
drawing concentrated chemical from the reservoir in response to operating the pump;
delivering the concentrated chemical to the diluent; and
dispensing the diluent and the concentrated chemical from the housing only by gravitational force.

21. The method of claim 20, wherein the concentrated chemical is delivered to the wheel and further comprising mixing the diluent and concentrated chemical in the wheel.

22. The method of claim 21, further comprising generating a foam in response to mixing the concentrated chemical and the diluent in the wheel.

23. The method of claim 20, further comprising:
operating a generator with the wheel;
generating electricity with the generator; and
powering the pump with the electricity.

24. The method of claim 23, further comprising:
rotating a shaft coupled to the wheel;
rotating a set of gears in response to rotation of the shaft, wherein rotation of the gears operates the pump.

25. The method of claim 20, wherein the fluid passageway defines at least a portion of the area from which diluent flows by gravity.

26. A method for proportionately mixing a concentrated chemical with a diluent, the method comprising:
delivering a diluent to a fluid passageway of a housing;
rotating a wheel that is coupled to the housing and in fluid communication with the fluid passageway via the impact or weight of diluent on the wheel;
rotating a shaft coupled to the wheel in response to rotating the wheel, wherein the shaft includes a rotary metering device coupled to the shaft, the rotary metering device being positioned in a selectively blocking position of an aperture positioned in a concentrated chemical reservoir integral with the housing, wherein the concentrated chemical reservoir holds a quantity of concentrated chemical enclosed within the housing and inaccessible to a user from outside of the housing;

selectively dispensing concentrated chemical from the reservoir in response to rotation of the shaft and the rotary metering device; and delivering the dispensed concentrated chemical to the diluent, wherein the housing, the wheel, and the reservoir define a portable unit movable to different positions relative to a diluent source, the portable unit also movable relative to and removable from a wall of a vessel upon which the portable unit is supported.

* * * * *

UNITED STATES PATENT AND TRADEMARK OFFICE
CERTIFICATE OF CORRECTION

PATENT NO.       : 9,766,636 B2
APPLICATION NO.  : 12/282797
DATED            : September 19, 2017
INVENTOR(S)      : Timothy S. Jones et al.

It is certified that error appears in the above-identified patent and that said Letters Patent is hereby corrected as shown below:

On the Title Page

Under the subheading "Inventors," Line 3: replace "Racine, WA" with --Racine, WI--

Signed and Sealed this
First Day of May, 2018

Andrei Iancu
*Director of the United States Patent and Trademark Office*